United States Patent
Shimomura et al.

(10) Patent No.: US 12,424,916 B2
(45) Date of Patent: Sep. 23, 2025

(54) VIBRATION ACTUATOR WITH MOVABLE BODY AND FIXING BODY WITH GAP AND FLUID AND PIPE RESISTANCE TO FLUID

(71) Applicants: Shigeyuki Shimomura, Tokyo (JP); Yuki Ogihara, Tokyo (JP); Yosuke Kinoshita, Tokyo (JP)

(72) Inventors: Shigeyuki Shimomura, Tokyo (JP); Yuki Ogihara, Tokyo (JP); Yosuke Kinoshita, Tokyo (JP)

(73) Assignee: Minebea Mitsumi Inc., Nagano (JP)

( * ) Notice: Subject to any disclaimer, the term of this patent is extended or adjusted under 35 U.S.C. 154(b) by 243 days.

(21) Appl. No.: 18/140,011

(22) Filed: Apr. 27, 2023

(65) Prior Publication Data

US 2024/0079942 A1   Mar. 7, 2024

(30) Foreign Application Priority Data

Apr. 28, 2022   (JP) .................................. 2022-074819

(51) Int. Cl.
*H02K 33/00* (2006.01)
*G08B 6/00* (2006.01)
*H02K 33/18* (2006.01)

(52) U.S. Cl.
CPC .............. *H02K 33/18* (2013.01); *G08B 6/00* (2013.01)

(58) Field of Classification Search
CPC ...... H02K 35/00; H02K 35/02; H02K 11/046; H02K 7/1869; H02K 7/1876; H02K 41/02; H02K 33/00; H02J 1/00; H04N 11/00; H04N 11/002

USPC .. 310/12, 12.12, 12.01, 12.03, 12.13, 12.16, 310/12.26, 25, 15

See application file for complete search history.

(56) References Cited

U.S. PATENT DOCUMENTS

| | | | | | |
|---|---|---|---|---|---|
| 5,973,422 | A * | 10/1999 | Clamme | ............... | H02K 33/16 310/90.5 |
| 6,501,357 | B2 * | 12/2002 | Petro | .................. | H01H 51/2209 335/229 |
| 6,983,923 | B2 * | 1/2006 | Fukui | .................... | F16K 31/082 335/229 |
| 7,078,832 | B2 * | 7/2006 | Inagaki | .................... | H02K 7/14 335/238 |

(Continued)

FOREIGN PATENT DOCUMENTS

JP   3748637   2/2006

OTHER PUBLICATIONS

European Search Report and the European Search Opinion Dated Sep. 11, 2023 From the European Patent Office Re. Application No. 23170335.6. (8 Pages).

*Primary Examiner* — Maged M Almawri

(57) ABSTRACT

Provided is a vibration actuator including: a movable body including a magnet having a pillar shape; and a fixing body including a coil and a main body part. The main body part includes an inner peripheral surface, which surrounds the movable body with a gap between the inner peripheral surface and an outer peripheral surface of the movable body inside the coil, and supports the movable body via an elastic support part such that the movable body is vibratable in an axial direction of the movable body. The vibration actuator is configured to cause a flow of a fluid in a direction opposite to a direction of movement of the movable body in the gap and to generate a pipe resistance to the fluid.

9 Claims, 17 Drawing Sheets

(56) References Cited

U.S. PATENT DOCUMENTS

| | | | | |
|---|---|---|---|---|
| 7,586,220 B2* | 9/2009 | Roberts | H02K 1/34 | 290/1 R |
| 7,791,456 B2* | 9/2010 | Miura | H02K 33/16 | 340/407.1 |
| 7,948,124 B1* | 5/2011 | Waters | H02K 35/00 | 310/36 |
| 8,013,480 B2* | 9/2011 | Bang | B06B 1/045 | 310/12.33 |
| 8,097,991 B2* | 1/2012 | Masami | H02K 33/16 | 310/15 |
| 8,278,786 B2* | 10/2012 | Woo | H02K 33/16 | 310/15 |
| 8,288,899 B2* | 10/2012 | Park | H02K 33/16 | 310/71 |
| 8,456,032 B2* | 6/2013 | Hochberg | F03B 13/00 | 290/43 |
| 8,492,937 B2* | 7/2013 | Roberts | H02K 35/00 | 310/32 |
| 8,575,794 B2* | 11/2013 | Lee | H02K 33/18 | 310/15 |
| 8,593,017 B2* | 11/2013 | Stefanini | H02K 35/02 | 290/1 R |
| 9,461,530 B2* | 10/2016 | Wasenczuk | H02K 35/02 | |
| 9,815,085 B2* | 11/2017 | Chun | G06F 3/016 | |
| 10,622,538 B2* | 4/2020 | Zhang | H10N 30/802 | |
| 11,031,857 B2* | 6/2021 | Wasenczuk | H02N 2/186 | |
| 11,152,843 B2* | 10/2021 | Wasenczuk | H02K 1/34 | |
| 11,418,099 B2* | 8/2022 | Takahashi | H02K 33/16 | |
| 2003/0120157 A1* | 6/2003 | Fukui | F16K 31/0679 | 600/484 |
| 2004/0119343 A1* | 6/2004 | Ueda | G10K 9/22 | 310/12.31 |
| 2006/0002577 A1* | 1/2006 | Won | B06B 1/045 | 381/396 |
| 2007/0085425 A1* | 4/2007 | Hirashima | H02K 33/16 | 310/15 |
| 2007/0182257 A1* | 8/2007 | Miura | H04R 9/02 | 310/23 |
| 2008/0265692 A1* | 10/2008 | Roberts | H02K 1/34 | 310/15 |
| 2009/0320219 A1* | 12/2009 | Takahashi | H02K 33/16 | 15/21.1 |
| 2010/0327672 A1* | 12/2010 | Roberts | H02K 35/00 | 310/25 |
| 2011/0018364 A1* | 1/2011 | Kim | H02K 33/18 | 310/20 |
| 2011/0018365 A1* | 1/2011 | Kim | B06B 1/045 | 310/20 |
| 2011/0062803 A1* | 3/2011 | Lee | H02K 33/18 | 310/29 |
| 2011/0068640 A1* | 3/2011 | Choi | H02K 5/04 | 310/25 |
| 2011/0089773 A1* | 4/2011 | Choi | H02K 33/16 | 310/25 |
| 2011/0133577 A1* | 6/2011 | Lee | H02K 33/18 | 310/15 |
| 2011/0193426 A1* | 8/2011 | Chung | H02K 33/16 | 310/25 |
| 2011/0193427 A1* | 8/2011 | Lemieux | F03G 7/08 | 310/25 |
| 2011/0198948 A1* | 8/2011 | Keisuke | H02K 5/225 | 310/25 |
| 2011/0198949 A1* | 8/2011 | Furuich | H02K 33/16 | 310/25 |
| 2011/0254385 A1* | 10/2011 | Makino | H02K 41/03 | 310/12.14 |
| 2011/0291497 A1* | 12/2011 | Choi | H02K 33/18 | 310/25 |
| 2012/0032535 A1* | 2/2012 | Park | H02K 35/02 | 310/25 |
| 2012/0293022 A1* | 11/2012 | Park | B06B 1/045 | 310/25 |
| 2013/0033128 A1* | 2/2013 | Yoon | H02K 33/18 | 310/25 |
| 2013/0033129 A1* | 2/2013 | Hong | B06B 1/045 | 310/25 |
| 2013/0043766 A1* | 2/2013 | Takahashi | H04R 17/00 | 310/326 |
| 2013/0099600 A1* | 4/2013 | Park | B06B 1/045 | 310/15 |
| 2013/0169071 A1* | 7/2013 | Endo | H02K 33/12 | 310/25 |
| 2013/0285479 A1* | 10/2013 | Kinoshita | H02K 35/02 | 310/12.12 |
| 2014/0062225 A1* | 3/2014 | Kim | H02K 33/00 | 310/15 |
| 2014/0103751 A1* | 4/2014 | Furukawa | H02K 35/02 | 310/25 |
| 2017/0328441 A1* | 11/2017 | Kanaya | F16F 13/26 | |
| 2019/0267882 A1* | 8/2019 | Matsuyama | H02K 33/18 | |
| 2020/0389078 A1* | 12/2020 | Takahashi | H02K 33/16 | |
| 2021/0336521 A1* | 10/2021 | Ando | H02K 33/18 | |
| 2022/0123642 A1* | 4/2022 | Takahashi | H02K 33/16 | |

* cited by examiner

VIBRATION ACTUATOR WITH MOVABLE BODY AND FIXING BODY WITH GAP AND FLUID AND PIPE RESISTANCE TO FLUID

CROSS REFERENCE TO RELATED APPLICATIONS

This application claims the benefit of priority of Japanese Patent Application No. 2022-074819, filed on Apr. 28, 2022, the contents of which are incorporated by reference as if fully set forth herein in their entirety.

TECHNICAL FIELD

The present invention relates to a vibration actuator and an electric apparatus including the same.

BACKGROUND ART

In the related art, a vibration actuator as a vibration generation source is implemented in an electronic apparatus having a vibration function as an electric apparatus. The electronic apparatus can give stimulation, notify an incoming call, and improve an operational feeling and/or a sense of realism by driving the vibration actuator such that a vibration is transmitted to the user and the user bodily feels the vibration. Note that, the electronic apparatus is mainly a hand-carry electric apparatus including a portable game terminal, a controller (gamepad) of a stationary game machine, a portable communication terminal such as a mobile phone and a smartphone, a portable information terminal such as a tablet PC, or the like. Further, the vibration actuator may also be implemented in a wearable terminal or the like which is attached to clothes, an arm, or the like.

As a vibration actuator implemented in a portable apparatus and having a structure that can be reduced in size, for example, a vibration actuator used for a pager or the like is known as indicated in Patent Literature (hereinafter referred to as "PTL") 1.

In this vibration actuator, a pair of plate-shaped elastic bodies is disposed so as to face each other and each of the pair is supported by an opening edge part of a frame body having a columnar shape. In addition, in this vibration actuator, a yoke to which a magnet is attached is fixed to a raised center portion of one plate-shaped elastic body, which has a spiral shape, of the pair of plate-shaped elastic bodies, and the yoke is supported within the frame.

The yoke and the magnet configure a magnetic field generating body having a circular shape and, within the magnetic field of the magnetic field generating body, a coil is disposed in a state of being attached to the other plate-shaped elastic body. When electric currents having different frequencies are given to the coil in a switching manner through an oscillation circuit, the pair of plate-shaped elastic bodies selectively resonates to generate a vibration and the yoke vibrates in a direction of a center line of the frame body within the frame body.

In this vibration actuator, the distance between the magnet and the coil and the distance between the yoke and the coil are greater than the distance between the yoke and an inner peripheral wall of the frame body. Accordingly, in a case where an impact is received from outside, the yoke first collides with the inner peripheral wall of the frame body, and thus, the yoke or the magnet does not come into contact with the coil, and the coil is prevented from being damaged.

CITATION LIST

Patent Literature

PTL 1
Japanese Patent No. 3748637

SUMMARY OF INVENTION

Technical Problem

Incidentally, as products in which a vibration actuator as a vibration generating body is mounted have been reduced in size, size reduction for the vibration actuator has been being achieved while its high output has been being ensured.

In the structure of the vibration actuator for which size reduction has been being achieved, the vibration actuator desirably generates a vibration in a wide frequency band in accordance with an environment for use.

An object of the present invention is to provide a vibration actuator and an electric apparatus each capable of generating, while size reduction is being achieved, a suitable vibration output in a wide frequency band in accordance with an environment for use or the like.

Solution to Problem

In order to achieve the object mentioned above, a vibration actuator of the present invention includes: a movable body including a magnet having a pillar shape; and a fixing body including a coil and a main body part. The main body part includes an inner peripheral surface, which surrounds the movable body with a gap between the inner peripheral surface and an outer peripheral surface of the movable body inside the coil, and supports the movable body via an elastic support part such that the movable body is vibratable in an axial direction of the movable body. The vibration actuator is configured to cause a flow of a fluid in a direction opposite to a direction of movement of the movable body in the gap and to generate a pipe resistance to the fluid.

An electric apparatus of the present invention is a hand-carry electric apparatus or a wearable electric apparatus and has a configuration in which the vibration actuator configured as described above is implemented in a contact part which comes into contact with a user.

Advantageous Effects of Invention

According to the present invention, it is possible to generate, while size reduction is being achieved, a suitable vibration output in a wide frequency band in accordance with an environment for use.

DESCRIPTION OF EMBODIMENTS

Hereinafter, an embodiment of the present invention will be described in detail with reference to the accompanying drawings.

[Entire Configuration of Vibration Actuator]

Figure 1:
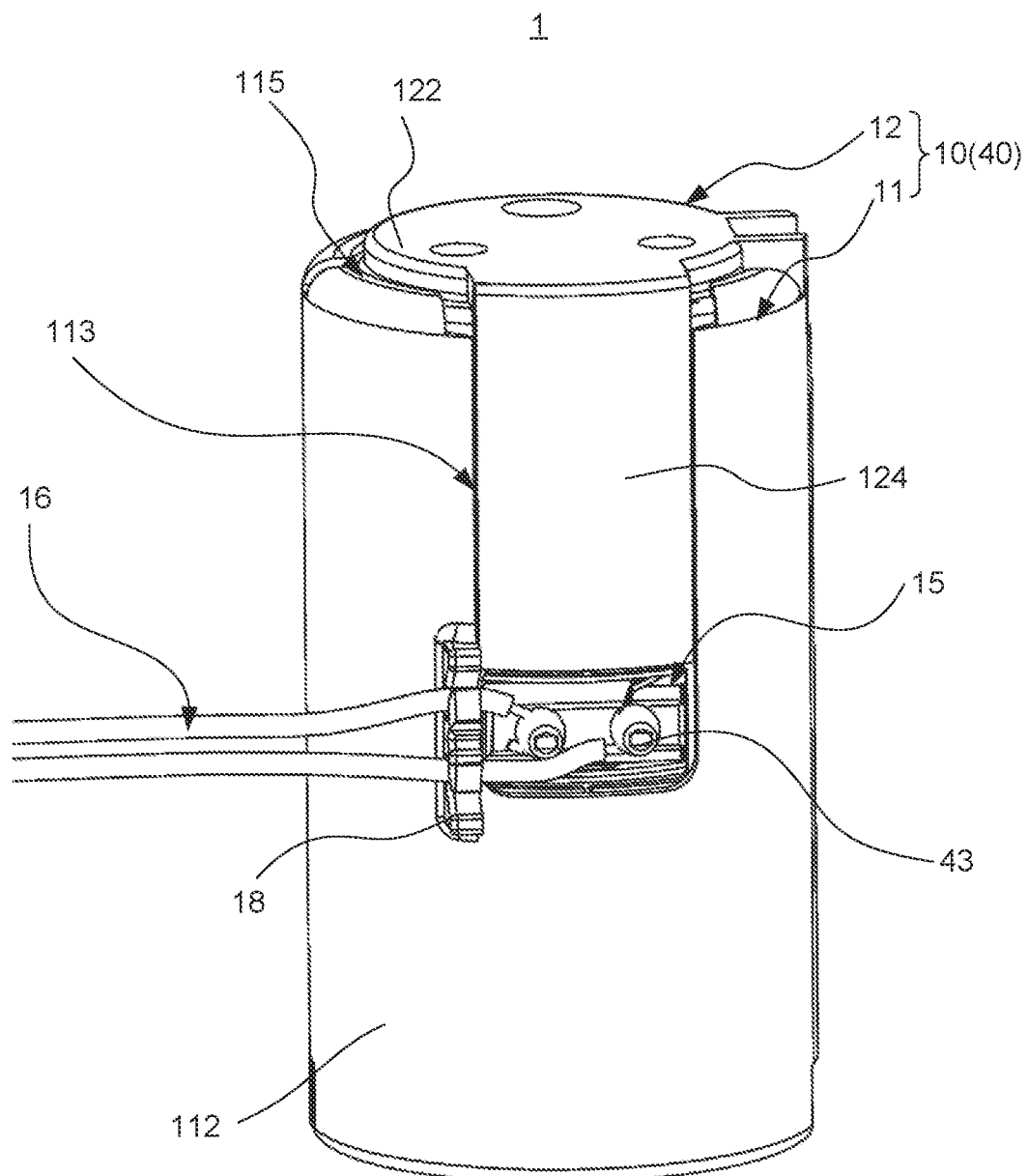
FIG. 1 is a perspective view of an external appearance of a vibration actuator according to an embodiment of the present invention when viewed from a front side.
Figure 2:
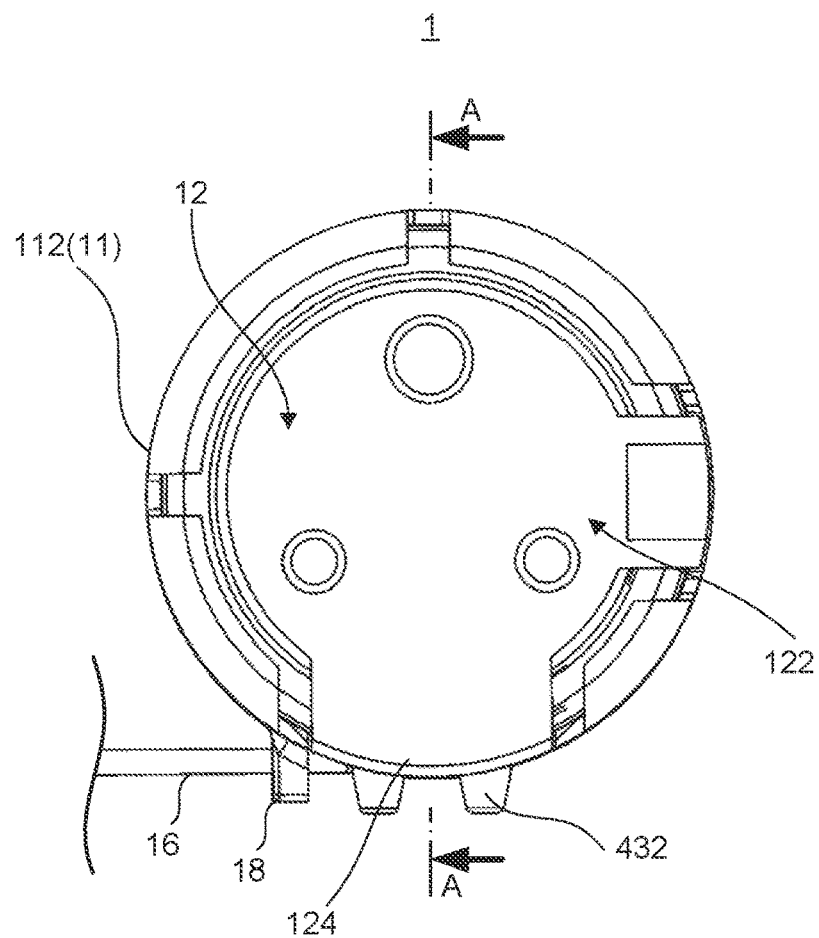
FIG. 2 is a plan view of the vibration actuator.
Figure 3:
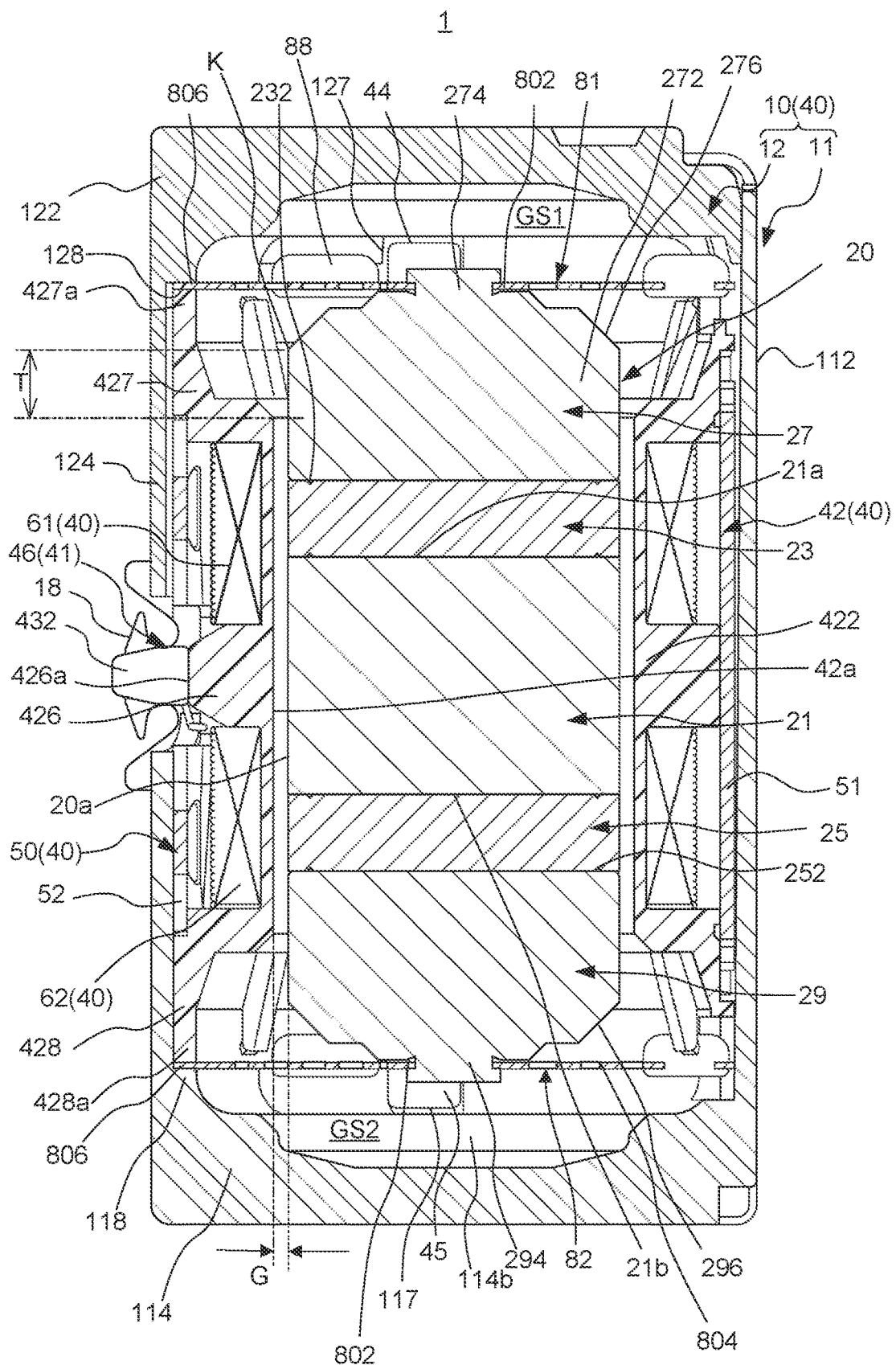
FIG. 3 is a cross-sectional view taken along A-A line of FIG. 2.
Figure 4:
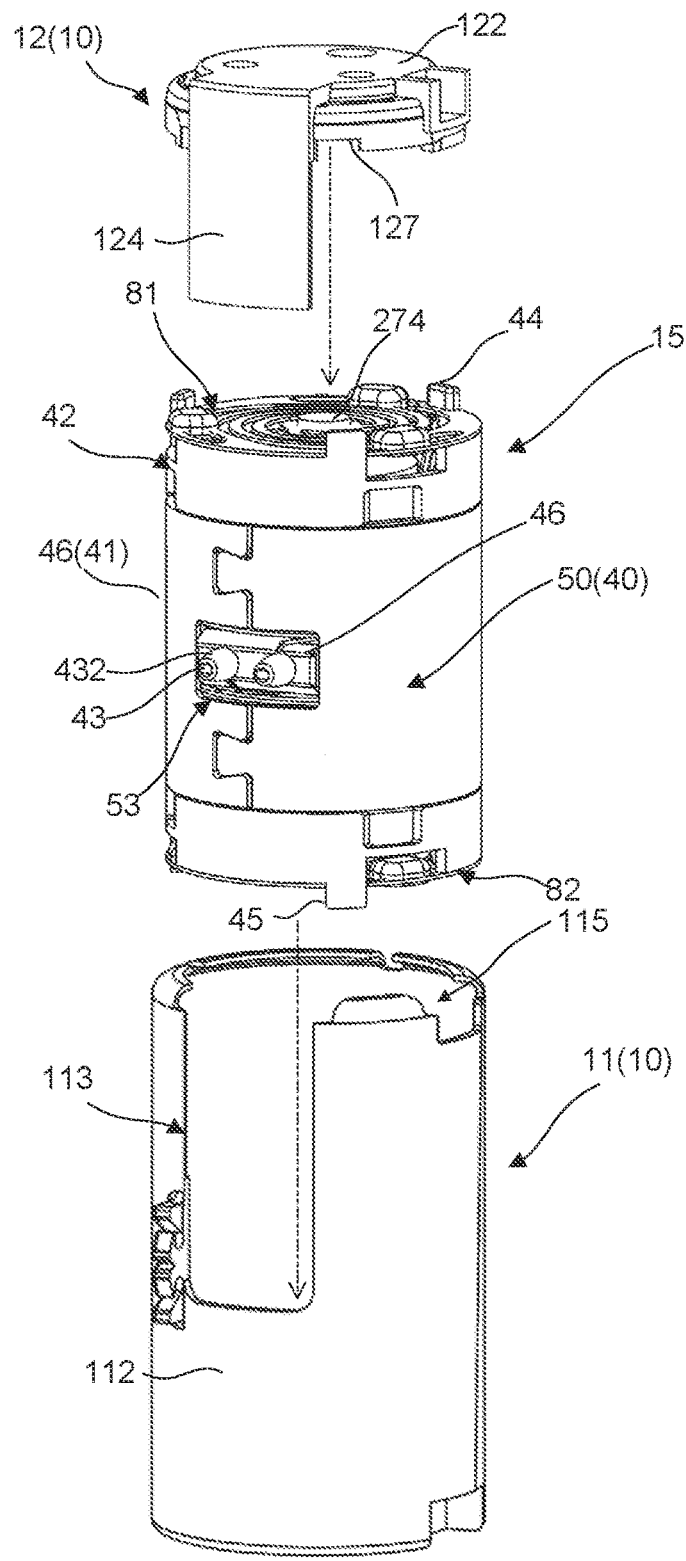
FIG. 4 illustrates a state in which a case and a driving unit inside the case in the vibration actuator are disassembled.
Figure 5:
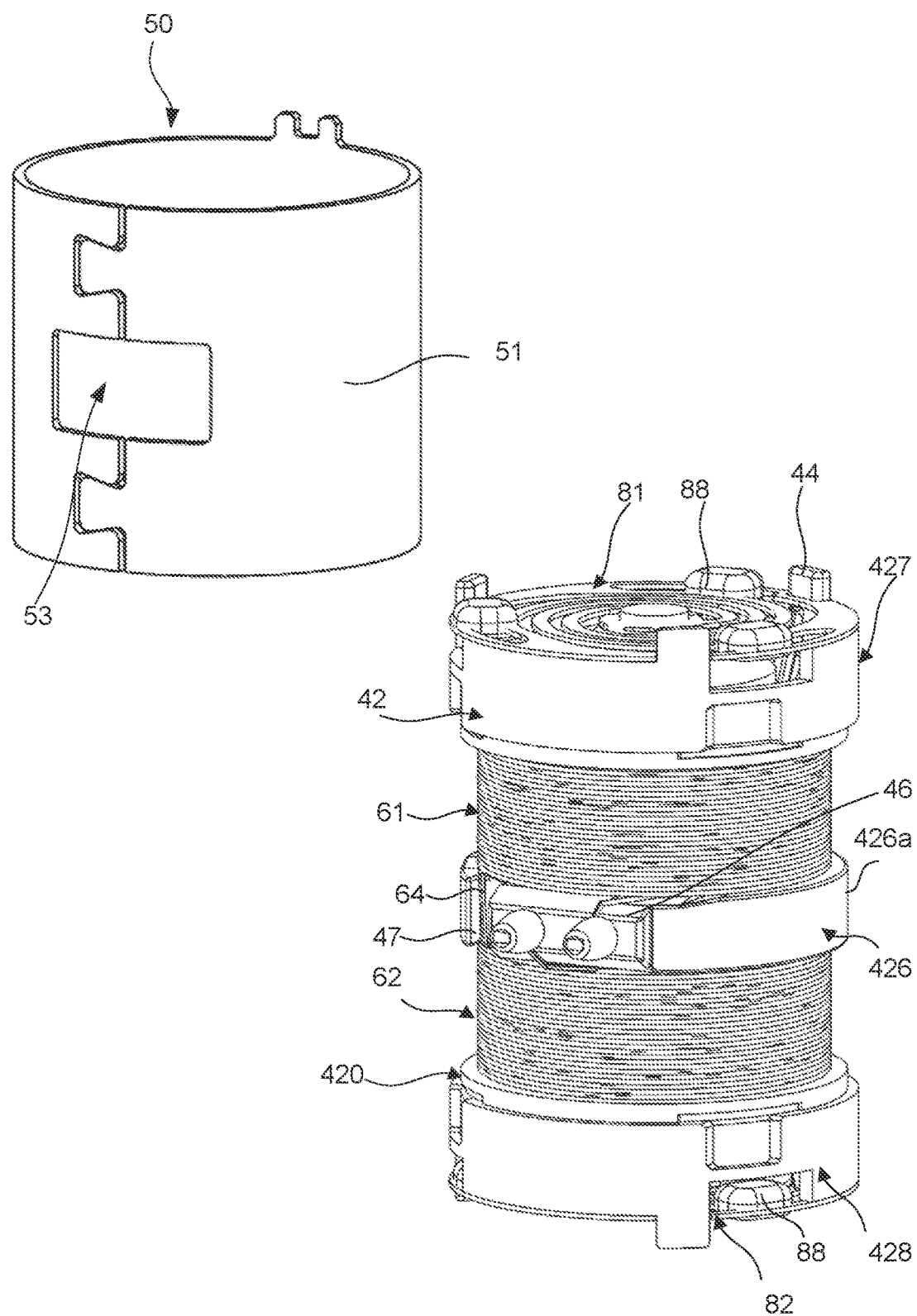
FIG. 5 illustrates an outer surface of a coil assembly of the driving unit in which an outer yoke is detached from the coil assembly.
Figure 6:
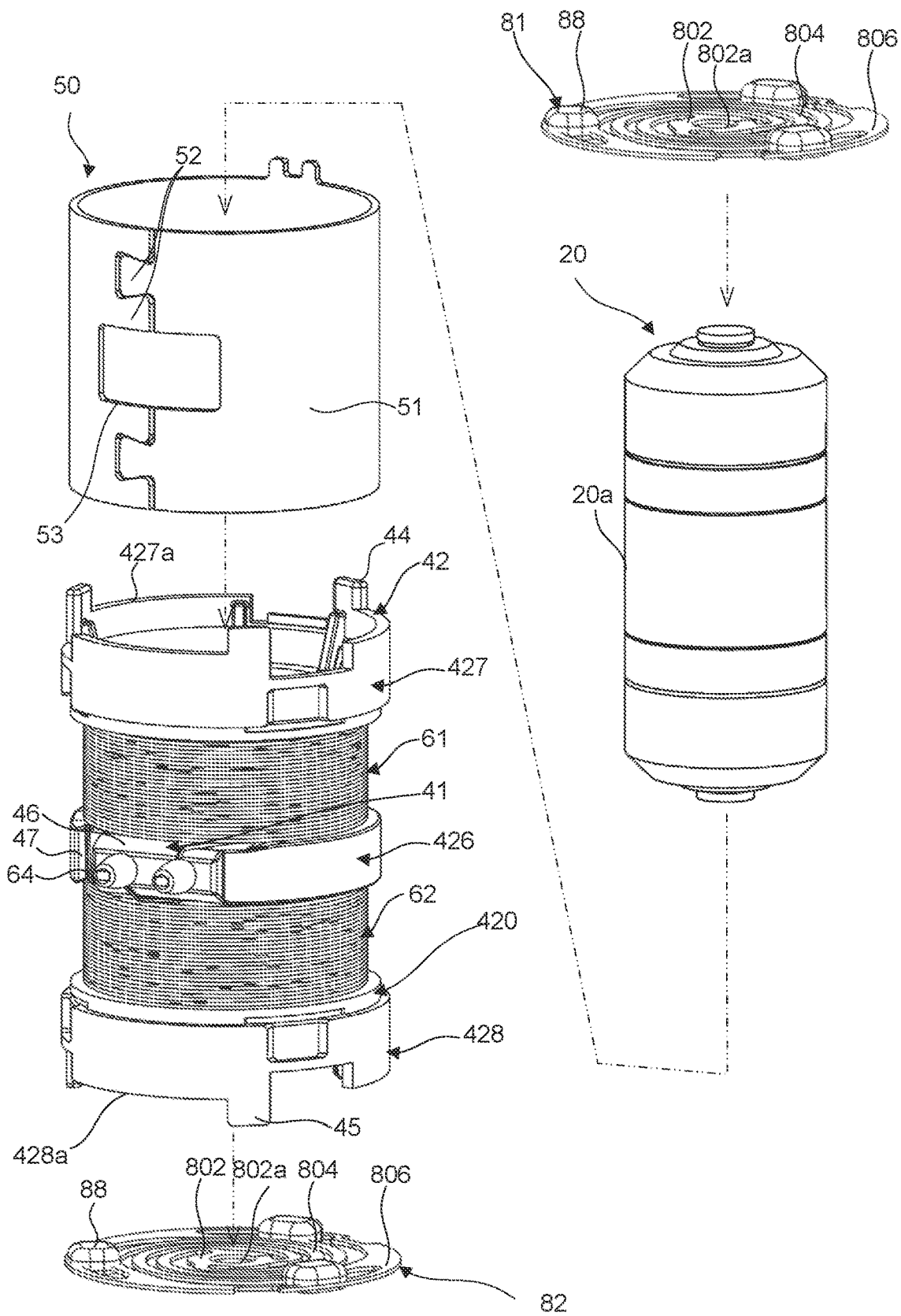
FIG. 6 is an exploded perspective view of the coil assembly and a movable body.

FIG. 1 is a perspective view of an external appearance of a vibration actuator according to an embodiment of the present invention when viewed from a front side. FIG. 2 is a plan view of the vibration actuator. FIG. 3 is a cross-sectional view taken along A-A line of FIG. 2. Further, FIG. 4 illustrates a state in which a case and a driving unit inside the case in the vibration actuator are disassembled. Further, FIG. 5 illustrates an outer surface of a coil assembly of the driving unit in which an outer yoke is detached from the coil assembly, and FIG. 6 is an exploded perspective view of the coil assembly and a movable body.

Note that, the "upper" side and the "lower" side in the present embodiment are used for the sake of convenience in order to facilitate understanding and mean one side and the other side in an axial direction, that is, a vibration direction of the movable body in the vibration actuator, respectively. That is, the upper and lower sides may be reversed or the upper and lower sides may be the right and left sides when the vibration actuator is mounted in an electric apparatus (for example, electronic apparatuses illustrated in FIGS. 19 and 20). Note that, illustration of the lead wire indicated in FIG. 1 will be omitted in FIGS. 3 to 6 and 9 for convenience.

Vibration actuator 1 is implemented as a vibration generation source in an electronic apparatus, such as a portable game terminal apparatus (see FIG. 19), as an electric apparatus, and realizes the vibration function of the electronic apparatus. This electronic apparatus also includes a portable apparatus such as a smartphone (see FIG. 20). Vibration actuator 1 is implemented in each apparatus such as a portable game terminal apparatus or a portable apparatus, and is driven to vibrate to notify the user of an incoming call or give an operational feeling and/or a sense of realism to the user.

As illustrated in FIG. 1, vibration actuator 1 is a vibration body including case 10 having a pillar shape and is formed in, for example, a cylindrical shape.

In the present embodiment, case 10 is a hollow cylindrical body that is configured with a plurality of case parts and includes case main body 11 as a first case and lid part 12 as a second case as illustrated in FIGS. 1 to 4. Note that, case 10 is not provided with any ventilation hole for communicating outside with inside. A detailed description of case 10 will be provided later.

As illustrated in FIGS. 1 to 4, vibration actuator 1 is configured by housing driving unit 15 including movable body 20, which vibrates, within case 10. When movable body 20 moves in an axial direction, which is a vibration direction, of movable body 20, vibration actuator 1 itself functions as a vibration body.

In the present embodiment, driving unit 15 has a cylindrical shape as a whole, and its central axis (not illustrated) is parallel to or coaxial with the central axis (not illustrated) of case 10 that also has a cylindrical shape. Further, in the present embodiment, the vibration direction of movable body 20 is a straight line direction that extends along the direction of the central axis of driving unit 15 having a cylindrical shape and includes F direction and −F direction (see FIG. 16).

Vibration actuator 1 includes movable body 20 including magnet 21, first yoke 23, second yoke 25, and weight parts (first weight part 27 and second weight part 29); fixing body 40 including coils (a pair of coils 61 and 62), coil holding part 42, and a case; and elastic support parts 81 and 82 having a plate shape.

As illustrated in FIG. 3, vibration actuator 1 includes gap G having an annular shape (see FIG. 3; hereinafter simply referred to as "gap G") between inner peripheral surface 42a of coil holding part 42 of fixing body 40 and outer peripheral surface 20a of movable body 20. In vibration actuator 1, movable body 20 is supported with respect to fixing body 40 via elastic support parts 81 and 82 such that movable body 20 is vibratable in the axial direction. In this vibration actuator 1, movable body 20 and coil holding part 42 are included in driving unit 15 that is housed within case 10.

Vibration actuator 1 is configured to cause a flow of a fluid in a direction opposite to a movement direction of movable body 20 in gap G and to generate a pipe resistance to the fluid. Note that, details of gap G will be described later together with a description of the pipe resistance.

Driving unit 15 illustrated in FIGS. 3 to 6 includes coil holding part 42, outer yoke 50, movable body 20, and elastic support parts 81 and 82. Coil holding part 42 and coils 61 and 62 configure a coil assembly which is a part of the fixing body.

Movable body 20 is disposed within coil holding part 42, with gap G between movable body 20 and inner peripheral surface 42a of coil holding part 42, via elastic support parts 81 and 82 disposed to face each other at a distance from each other in the axial direction (vibration direction). Driving unit 15 supports movable body 20 such that movable body 20 is reciprocatable in the vibration direction in a suspended state with respect to coil holding part 42.

Note that, driving unit 15 is connected to an external apparatus via terminal tying part (connection part) 43 exposed at the outer peripheral surface of driving unit 15

(the outer peripheral surface of coil holding part 42) and receives power supply from the external apparatus.

As illustrated in FIGS. 3 to 6, the coil assembly is a tubular body that configures, together with outer yoke 50, a part of the fixing body. The coil assembly movably houses movable body 20 therein via elastic support parts 81 and 82.

<Movable Body 20>

As illustrated in FIG. 3, movable body 20 is disposed inside coil holding part 42, which has a tubular shape, of fixing body 40 at an interval in the radial direction. Movable body 20 has a pillar shape and is connected to inner periphery parts of elastic support parts 81 and 82 at both the end parts (upper and lower end parts) that are at a distance from each other in the axial direction, that is, the vibration direction. Elastic support parts 81 and 82 are attached so as to cover both opening parts (opening end parts 427*a* and 428*a*) of coil holding part 42 having a tubular shape.

Movable body 20 is supported so as to be reciprocatable in the axial direction along inner peripheral surface 42*a* of coil holding part 42. Movable body 20 may have any flat cross-sectional shape as long as movable body 20 has a pillar shape. Movable body 20 is preferably formed in, for example, a cylindrical shape or a polygonal shape approximate to a cylindrical shape, and the shape thereof preferably allows the gap between movable body 20 and inner peripheral surface 42*a* of coil holding part 42 (tubular main body part 422) to be easily configured with a constant width over the entire circumference. Note that, outer peripheral surface 20*a* of movable body 20 has a length protruding from inner peripheral surface 42*a* of coil holding part 42 on both sides of coil holding part 42 in the axial direction over the entire movable field of movable body 20 and maintains generation of a pipe resistance serving as an air attenuation effect in the entire field of the movable field of movable body 20.

Figure 7:
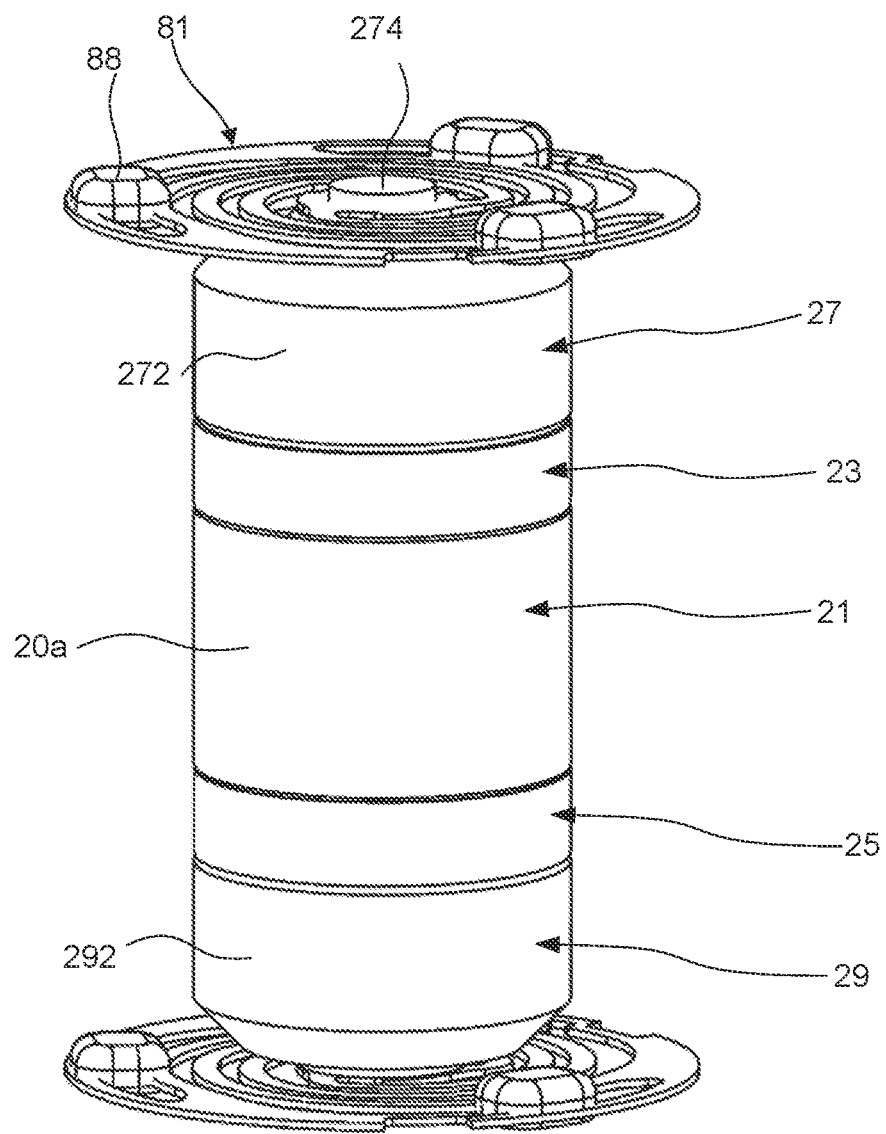
FIG. 7 is a perspective view of the movable body and elastic support parts.
Figure 8:
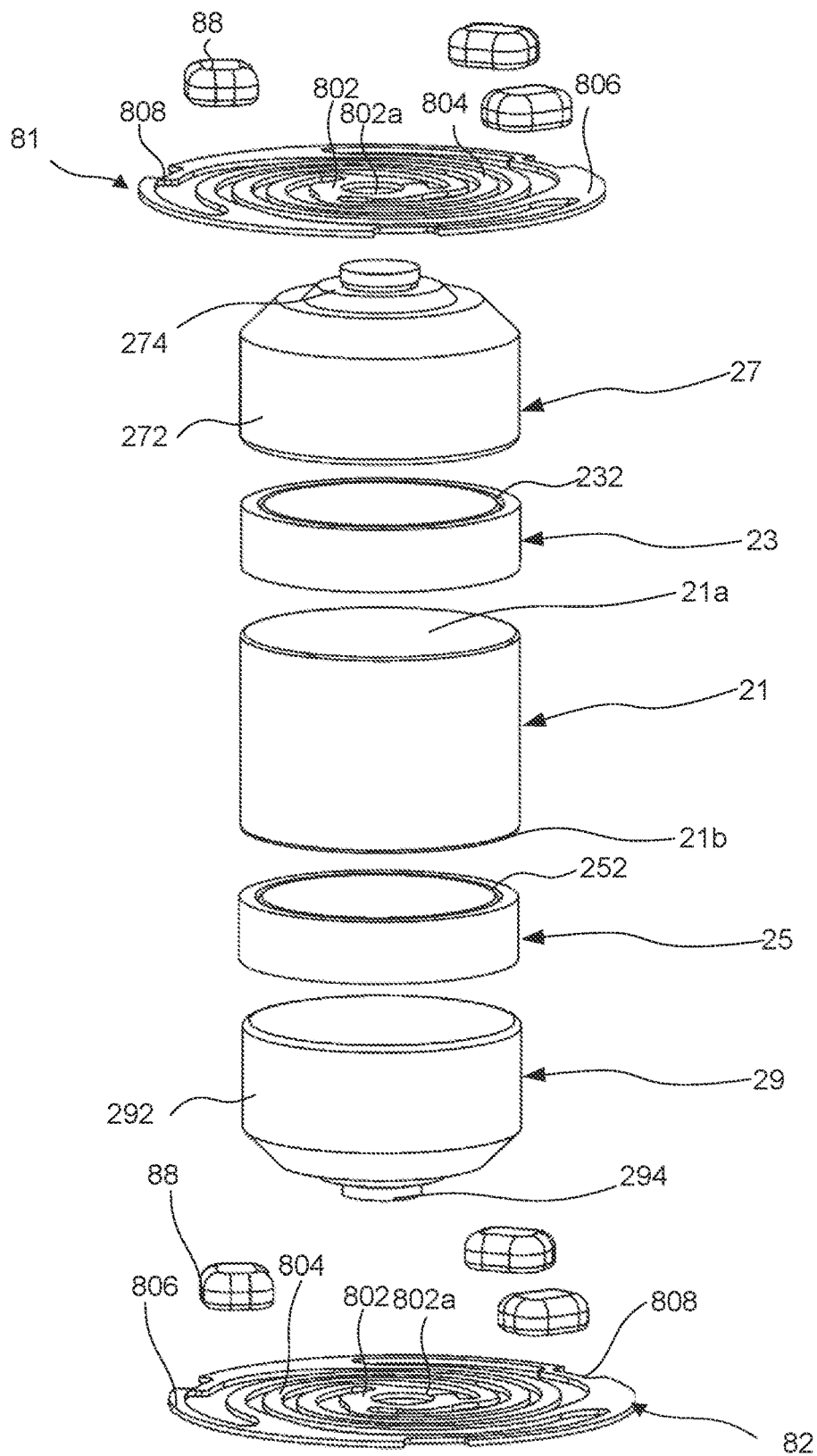
FIG. 8 is an exploded perspective view of the movable body and the elastic support parts.

FIG. 7 is a perspective view of the movable body to which the elastic support parts have been attached. FIG. 8 is an exploded perspective view of the movable body to which the elastic support parts are attached.

As illustrated in FIGS. 6 to 8, movable body 20 includes magnet 21, a pair of weight parts (weight parts 27 and 29), and a pair of movable body yokes (first yoke 23 and second yoke 25) disposed between magnet 21 and the pair of weight parts 27 and 29.

In the present embodiment, magnet 21 is disposed in a center part of movable body 20 in the vibration direction that is the axial direction of movable body 20, that is, in the center of movable body 20 as illustrated in FIGS. 3, 7 and 8. On both sides (a side of front surface 21*a* and a side of rear surface 21*b* illustrated in FIG. 8, which are in the up-down direction in each drawing) of magnet 21 in the vibration direction, first yoke 23 and second yoke 25 are disposed symmetrically with respect to magnet 21 as well as weight parts 27 and 29 are disposed symmetrically with respect to magnet 21. Specifically, first yoke 23 and weight part 27 are sequentially stacked on one side of the both sides of magnet 21 in the vibration direction, and second yoke 25 and weight part 29 are sequentially stacked on the other side of the both sides of magnet 21 in the vibration direction.

In movable body 20, the outer diameters of magnet 21, first yoke 23, second yoke 25, and weight parts 27 and 29 are configured to be the same or substantially the same. Magnet 21, first yoke 23, second yoke 25, and weight parts 27 and 29 configure outer peripheral surface 20*a* that is flat in the axial direction. Thus, outer peripheral surface 20*a* of movable body 20 is a peripheral surface that is flush or substantially flush and is flat without unevenness.

At the time of non-driving, both the end parts (weight parts 27 and 29) of movable body 20 in the vibration direction are located outward in the vibration direction with respect to both the end parts of inner peripheral surface 42*a* of fixing part 40 (coil holding part 42) in the vibration direction.

Further, it is configured such that when movable body 20 is at each of the maximum amplitude positions on the both sides of movable body 20 in the vibration direction (see FIGS. 17A and 17B), weight part 27 or 29 that is one of weight parts 27 and 29 is located at a position that deviates from a range in which weight part 27 or 29 faces outer yoke 50 in the radial direction. Weight parts 27 and 29 are joined to first yoke 23 and second yoke 25 stacked on magnet 21, respectively, in the axial direction of the magnet such that outer peripheral surface 20*a* of movable body 20 protrudes from inner peripheral surface 42*a* of coil holding part 42 of fixing body 40 on both sides of outer peripheral surface 20*a* in the vibration direction (axial direction) over the entire movable field of movable body 20.

In movable body 20, the substantially flat peripheral surface of outer peripheral surface 20*a* without unevenness is specifically the outer peripheral surfaces of magnet 21, first yoke 23, second yoke 25, and parts of weight parts 27 and 29 (weight main bodies 272 and 292). These outer peripheral surfaces of magnet 21, first yoke 23, second yoke 25, and the parts of weight parts 27 and 29 (weight main bodies 272 and 292) face inner peripheral surface 42*a* of coil holding part 42 at a predetermined interval inside inner peripheral surface 42*a* even at a driving reference position and the maximum amplitude positions. Note that, the driving reference position is a position that serves as a reference when movable body 20 moves in the vibration direction, and is, for example, a position located at a center portion of the center of the vibration direction in a state with no energization. As illustrated in FIG. 3, movable body 20 has a stroke length of T×2 obtained by combining length T between position K and inner peripheral surface 42*a* and length T in a direction away from inner peripheral surface 42*a* by length T from position K.

<Magnet 21>

As illustrated in FIGS. 7 and 8, magnet 21 is a solid pillar-shaped body (including a solid pillar-shaped body having a plate shape) magnetized in the vibration direction. For example, front surface 21*a* and rear surface 21*b*, which are at a distance from each other in the vibration direction, of magnet 21 have polarities different from each other. Further, in the present embodiment, magnet 21 is formed in a cylindrical shape (which may be referred to as a circular plate shape) whose diameter (lateral width) is longer than the length (height) thereof in the vibration direction. Processing such as recess processing may be performed to magnet 21. However, as long as magnet 21 has a solid cylindrical shape, magnet 21 can be manufactured at a low cost in comparison with a magnet to which processing such as recess processing is performed. Magnet 21 is, for example, a neodymium-sintered magnet. As processing on magnet 21, a groove for storing an adhesive when first yoke 23 and second yoke 25 are joined to front surface 21*a* and rear surface 21*b* by adhesion or the like may be provided.

With respect to the coil (the pair of coils 61 and 62) (details thereof will be described later) held by coil holding part 42, magnet 21 is disposed inside the coil (the pair of coils 61 and 62) in the radial direction at an interval. Here, the "radial direction" is also a direction orthogonal to the axial direction (vibration direction) of the coil (the pair of coils 61 and 62). In other words, on an outer side in the radial direction, magnet 21 is disposed so as to face the center position of inner peripheral surface 42*a* of coil holding part 42 in the vibration direction. Note that, hereinafter, the pair of coils 61 and 62 may also be referred to as "coils 61 and 62".

The above interval in the radial direction is an interval between coils 61 and 62 and magnet 21 in a state in which tubular main body part 422 around which coils 61 and 62 are wound is located between coils 61 and 62 and magnet 21 inward in the radial direction of coils 61 and 62. In addition, the above interval is an interval that allows movable body 20 to move without coils 61 and 62 and magnet 21 coming into contact with each other in the vibration direction of movable body 20.

Magnet 21 may have a shape other than the solid pillar shape, such as a tubular shape and a plate shape, as long as magnet 21 is disposed such that two magnetization surfaces of magnet 21 are directed in the extending directions of the axes of coils 61 and 62 inside coils 61 and 62, respectively. Further, the center of magnet 21 in the axial direction desirably coincides with the center of movable body 20 in the axial direction.

<First Yoke 23 and Second Yoke 25>

First yoke 23 and second yoke 25 are magnetic substances, are disposed on front surface 21*a* and rear surface 21*b* of magnet 21, respectively, and improve efficiency of the magnetic circuit of the magnetic flux of magnet 21. First yoke 23 and second yoke 25 are formed in a pillar shape (which may also be a plate shape) with a thickness in the axial direction, and have the same outer diameter as magnet 21.

First yoke 23 and second yoke 25 have a pillar shape, are formed in, for example, a cylindrical shape (which may also be referred to as a circular plate shape) with the same diameter as magnet 21, and each of first yoke 23 and second yoke 25 has an outer peripheral surface flush with the outer peripheral surface of magnet 21. First yoke 23 and second yoke 25 are fixed to the front and rear surfaces of magnet 21. The outer peripheral surfaces of first yoke 23 and second yoke 25, the outer peripheral surface of magnet 21, and the parts of weight parts 27 and 29 configure outer peripheral surface 20*a*, which is flat, of movable body 20.

First yoke 23, second yoke 25, magnet 21, the coil (the pair of coils 61 and 62), and outer yoke 50 configure a magnetic circuit of vibration actuator 1. First yoke 23 and second yoke 25 concentrate the magnetic flux of magnet 21, efficiently cause the concentrated magnetic flux to flow without causing leakage, and effectively distribute the magnetic flux flowing between magnet 21 and the coil (the pair of coils 61 and 62). First yoke 23 and second yoke 25 are preferably formed of, for example, a metallic magnetic substance such as a SECC (bonderized steel plate).

In addition, first yoke 23 and second yoke 25 may have, in addition to the function as a part of the magnetic circuit, a function as a main body portion of movable body 20 and a function as a weight in movable body 20. Further, first yoke 23 and second yoke 25 have a function of positioning weight parts 27 and 29 with respect to magnet 21 by aligning, when weight parts 27 and 29 having the same outer diameter are joined, the outer diameters of weight parts 27 and 29 and magnet 21.

In the present embodiment, first yoke 23 and second yoke 25 are the same member formed in the same manner, and are disposed symmetrically with respect to magnet 21 on front surface 21*a* and rear surface 21*b* (upper and lower surfaces) of magnet 21 so as to hold magnet 21 therebetween. Note that, first yoke 23 and second yoke 25 may be fastened by being attracted by magnet 21, or may be fixed to magnet 21 with, for example, a thermosetting adhesive or an anaerobic adhesive such as an epoxy resin. First yoke 23 and second yoke 25 are fixed to weight parts 27 and 29 by the adhesive described above.

The joined part between magnet 21 and each of first yoke 23 and second yoke 25 is provided with a groove part (not illustrated) and groove part 252 as a gathering part that gathers an adhesive or a welding material. Each of the joined part between first yoke 23 and weight part 27 and the joined part between second yoke 25 and weight part 29 is provided with groove part 232 and a groove part (not illustrated) as a gathering part that gathers an adhesive or a welding material.

Groove parts 232 and 252 are provided along the circumferential direction in outer periphery parts of the front and rear surfaces of each of first yoke 23 and second yoke 25. Groove parts 232 and 252 are configured such that an adhesive or a welding material for joining members that are stacked on and fixed to first yoke 23 and second yoke 25 is gathered in groove parts 232 and 252 and does not protrude from groove parts 232 and 252 outward in the radial direction. That is, an adhesive or a welding material does not leak and protrude on an outer periphery side from the joined part between magnet 21 and each of first yoke 23 and second yoke 25 and from the joined part between first yoke 23 and weight part 27 and the joined part between second yoke 25 and weight part 29.

That is, groove parts 232 and 252 store, when each of magnet 21 and weight parts 27 and 29 is jointed via an adhesive to the front and rear surfaces of first yoke 23 and second yoke 25, the adhesive that is held between the objects to be joined and moves outward in the radial direction. Thus, first yoke 23 and magnet 21 are joined, first yoke 23 and weight part 27 are joined, second yoke 25 and magnet 21 are joined, and second yoke 25 and weight part 29 are joined without the adhesive protruding on an outer edge side from each of the joined part between first yoke 23 and magnet 21, the joined part between first yoke 23 and weight part 27, the joined part between second yoke 25 and magnet 21, and the joined part between second yoke 25 and weight part 29.

Accordingly, the outer peripheral surface of movable body 20 configured by joining magnet 21, first yoke 23, second yoke 25, and weight parts 27 and 29 can be a smooth peripheral surface.

Note that, groove parts 232 and 252 described above may be provided on at least one of the surfaces to be joined and may be provided on a side of magnet 21 or on sides of weight parts 27 and 29.

Groove parts 232 and 252 may be provided on at least one surface of the front and rear surfaces of each of first yoke 23 and second yoke 25. Since first yoke 23 and second yoke 25 include groove parts 232 and 252 in the front and rear surfaces of each of first yoke 23 and second yoke 25, first yoke 23 and second yoke 25 can be joined to magnet 21 or weight parts 27 and 29 without setting the orientations of first yoke 23 and second yoke 25 when first yoke 23 and second yoke 25 are joined to magnet 21 or weight parts 27 and 29. In a case where first yoke 23 and second yoke 25 are formed of a SECC or the like, first yoke 23 and second yoke 25 can be manufactured by press processing and groove parts 232 and 252 can be easily formed.

At the time of non-vibration, first yoke 23 and second yoke 25 are located so as to face the coil (the pair of coils 61 and 62), respectively, in the direction orthogonal to the axial direction of the coil (the pair of coils 61 and 62) inside (inward in the radial direction) the coil (the pair of coils 61 and 62).

At the time of non-vibration of movable body 20, first yoke 23 and second yoke 25 are preferably located so as to face the centers of the vibration directions of the pair of coils 61 and 62, respectively, in the direction orthogonal to the vibration direction inside (inward in the radial direction) the pair of coils 61 and 62.

Further, with respect to first yoke 23 and second yoke 25 in the present embodiment, the height position of the upper surface of first yoke 23 on the upper side of magnet 21 is preferably located on a lower side (center side) than the position of the upper end of coil 61 on the upper side. In addition, the height position of the lower surface of second yoke 25 on the lower side of magnet 21 is preferably located on an upper side (center side) than the position of the lower end of coil 62 on the lower side. With this configuration, first yoke 23, second yoke 25, magnet 21, coils 61 and 62, and outer yoke 50 configure a suitable magnetic path with high magnetic efficiency with few magnetic flux leakages.

<Weight Parts 27 and 29>

Weight parts 27 and 29 are provided in first yoke 23 and second yoke 25, respectively, which are joined to the front and rear surfaces of magnet 21 in the vibration direction (the magnetization direction of magnet 21), so as to hold first yoke 23 and second yoke 25 between weight parts 27 and 29.

Weight parts 27 and 29 are disposed at first yoke 23 and second yoke 25, respectively, symmetrically in the vibration direction with respect to a center part in the vibration direction, and increase the vibration output of movable body 20. Weight parts 27 and 29 configure end parts on the both sides of movable body 20 in the vibration direction, that is, both the end parts, which are located at a distance from magnet 21, respectively, on the both sides of movable body 20 in the vibration direction.

Weight parts 27 and 29 are preferably configured with a material having a high specific gravity. Weight parts 27 and 29 are formed of a material having a higher specific gravity than first yoke 23 and second yoke 25 and are formed by, for example, copper sintering or the like. Note that, weight parts 27 and 29 are preferably formed of a material having a higher specific gravity (for example, a specific gravity of approximately 16 to 19 g/cm$^3$) than a material such as a silicon steel sheet (the specific gravity of the steel sheet is 7.70 to 7.98 g/cm$^3$), and may be formed of tungsten (19.3 g/cm$^3$) or the like. Thus, even in a case where the dimension of the external shape of movable body 20 is set in design or the like, the mass of movable body 20 can be relatively easily increased, and a desired vibration output serving as a sufficient body-felt vibration to the user can be realized.

The outer diameter of weight parts 27 and 29 is the same diameter or substantially the same diameter as the outer diameter of first yoke 23 and second yoke 25.

Weight parts 27 and 29 include: weight main bodies 272 and 292 having a diameter that is the same or substantially the same as the outer diameter of first yoke 23 and second yoke 25; and spring fixing parts 274 and 294 that are projected from weight main bodies 272 and 292 and are connected to elastic support parts 81 and 82. Weight main bodies 272 and 292 are formed in a pillar shape (which may be referred to as a plate shape) and have a length in the vibration direction.

Weight parts 27 and 29 are formed in a cylindrical shape with both end surfaces at a distance from each other in the vibration direction and, for example, are configured in the same shape in the same manner. Weight part 27 is fixed to first yoke 23 on an end surface (one end surface) of weight part 27 on a side of magnet 21 and weight part 29 is fixed to second yoke 25 on an end surface (one end surface) of weight part 29 on a side of magnet 21. Elastic support part 81 is connected to weight part 27 via spring fixing part 274 on a side of the other end surface of weight part 27 at a distance from magnet 21 and elastic support part 82 is connected to weight part 29 via spring fixing part 294 on a side of the other end surface of weight part 29 at a distance from magnet 21.

The corner parts of the other end surfaces of weight parts 27 and 29 are provided with chamfered parts 276 and 296, respectively, which are formed by chamfering processing, and spring fixing parts 274 and 294 are projected from center parts of the other end surfaces of weight parts 27 and 29, respectively.

Chamfered parts 276 and 296 form relief parts that receive deformation of elastic support parts 81 and 82 that are connected to spring fixing parts 274 and 294 and radially extend when movable body 20 vibrates, and chamfered parts 276 and 296 do not cause elastic support parts 81 and 82 having been deformed to come into contact with movable body 20.

Thus, movable body 20 can suitably vibrate and ensures a high vibration output while size reduction of vibration actuator 1 is being achieved.

Note that, as long as weight parts 27 and 29 are configured with a non-magnetic substance, it is possible to suppress the expansion of the magnetic circuit configuration of vibration actuator 1 in the vibration direction and to configure the magnetic circuit compactly.

Since weight parts 27 and 29 are configured with, for example, a copper-sintered non-magnetic substance that does not affect the magnetic circuit size, it is possible to increase the degree of freedom in design of weight parts 27 and 29 in terms of obtaining desired vibration characteristics for movable body 20.

Spring fixing parts 274 and 294 fix movable body 20 to elastic support parts 81 and 82.

Spring fixing parts 274 and 294 are disposed along the axial center of weight main bodies 272 and 292 (the central axis of movable body 20) and each include a truncated conical part and a protruding end part.

Spring fixing parts 274 and 294 configure both the end parts of the movable body in the vibration direction. In spring fixing parts 274 and 294, the protruding end part is provided to be projected from a center part of the truncated conical part having a cross section with a truncated conical shape, and the protruding end part is joined to each of inner periphery parts 802 of elastic support parts 81 and 82. The protruding end part includes a caulking part formed in a flange shape at the leading end of the protruding end part, and is fixed to elastic support part 81 or 82 by caulking the caulking part to inner periphery part 802. Note that, the truncated conical part may not have a truncated conical shape, and may have a cylindrical shape, a polygonal trapezoidal shape or a polygonal shape.

Spring fixing parts 274 and 294 have an outer diameter smaller than the outer diameter of weight main bodies 272 and 292. Spring fixing part 274 configures one end part of movable body 20 in the vibration direction, that is, the upper-side end part of movable body 20, and is joined to inner periphery part 802 that is an inner diameter-side end part of an upper-side leaf spring as elastic support part 81. Spring fixing part 294 configures the other end part of movable body 20 in the vibration direction, that is, the lower-side end part of movable body 20, and is joined to inner periphery part 802 of a lower-side leaf spring as elastic support part 82.

In a state in which spring fixing parts 274 and 294 are fitted in and joined to inner periphery parts 802 and 802 of elastic support parts 81 and 82, each of inner periphery parts 802 and 802 is held between a leading end part having a flange shape and an upper surface of a conical part, and is securely held by weight part 27 or 29.

Note that, spring fixing parts 274 and 294 are fastened to elastic support parts 81 and 82 by performing caulking processing or the like on each leading end part (protruding end part) having a flange shape. Note that, it may also be configured such that spring fixing parts 274 and 294 are joined to elastic support part 81 and 82 by a method in which welding and/or adhesion are combined with caulking.

In movable body 20, spring fixing parts 274 and 294 are disposed at positions that deviate from a magnetic circuit on a side of the movable body, which includes magnet 21, first yoke 23, and second yoke 25. Thus, the space for disposing the pair of coils 61 and 62 is not limited, that is, the distance between the magnetic circuit on the side of the movable body (magnet 21, first yoke 23, and second yoke 25) and the pair of coils 61 and 62 is not increased, and electromagnetic conversion efficiency does not decrease. Accordingly, the weight of movable body 20 can be suitably increased, and a high vibration output can be realized.

<Fixing Body 40>

Figure 9:
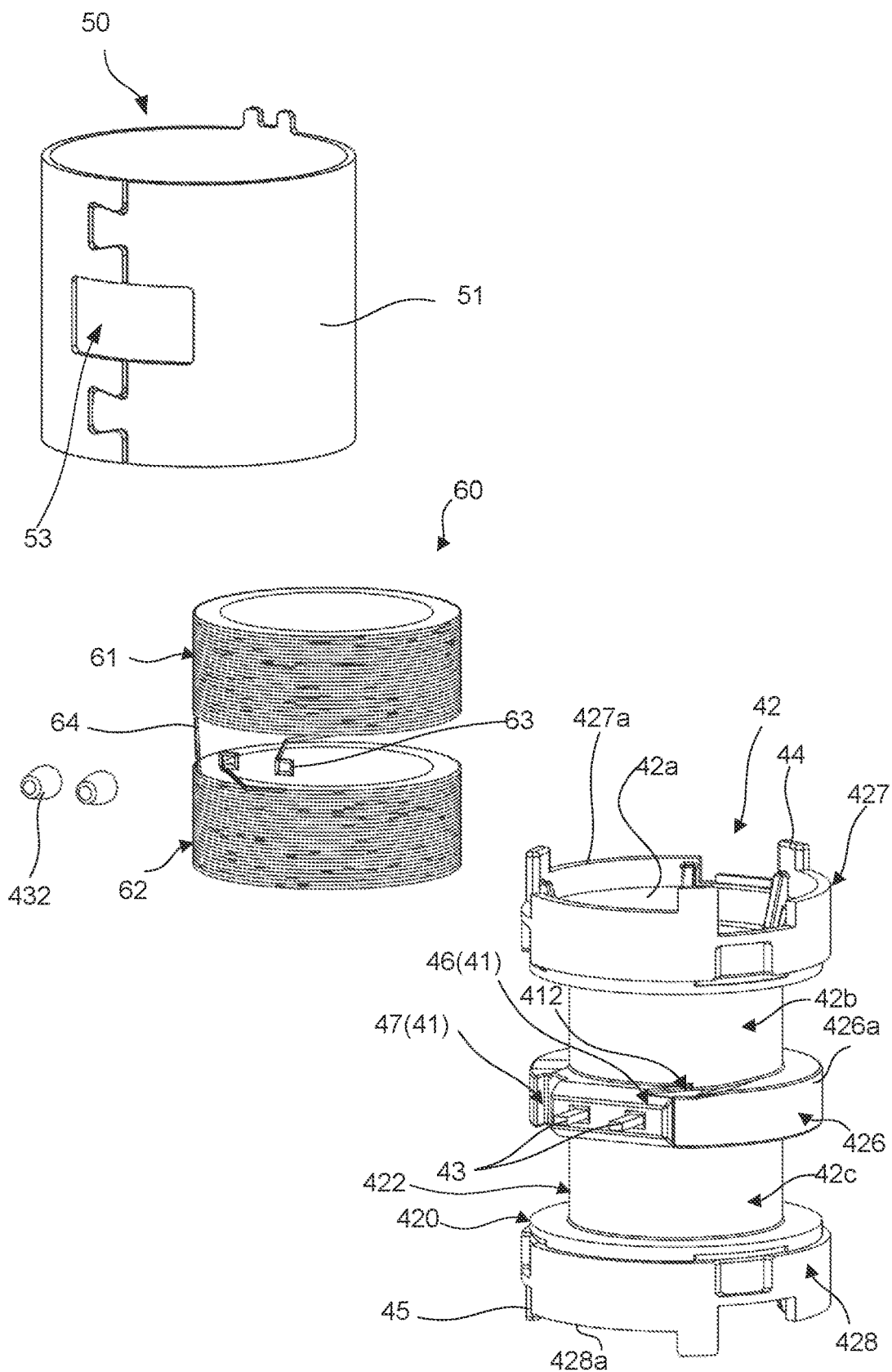
FIG. 9 is an exploded perspective view of the coil assembly.

FIG. 9 is an exploded perspective view of the coil assembly.

Fixing body 40 illustrated in FIGS. 3 to 6 and 9 houses movable body 20 including magnet 21 with gap G between inner peripheral surface 42a and outer peripheral surface 20a of movable body 20 inward in the radial direction of the pair of coils 61 and 62. Fixing body 40 movably supports movable body 20 in the axial direction (which is the vibration direction and the coil axial direction) of movable body 20 via elastic support parts 81 and 82.

Fixing body 40 includes case 10, the coil assembly, and outer yoke 50. The coil assembly includes the coil (the pair of coils 61 and 62) as well as coil holding part 42 that holds coils 61 and 62. The coil assembly, movable body 20, outer yoke 50, and elastic support parts 81 and 82 configure driving unit 15.

Fixing body 40 may be configured not to include case 10 as long as coil holding part 42 that holds the pair of coils 61 and 62 is configured to movably support movable body 20 via elastic support parts 81 and 82.

Coil holding part 42 is where coil 60 (the pair of coils 61 and 62) is disposed. Coil holding part 42 is configured with a non-magnetic substance. Coil holding part 42 may be formed in, for example, a bobbin shape for holding coils 61 and 62. Coil holding part 42 is a tubular body formed of a resin such as a phenolic resin and polybutylene terephthalate (PBT). In the present embodiment, coil holding part 42 is formed of a material including a phenolic resin such as Bakelite having a high flame retardancy.

Since coil holding part 42 is configured with a material including a phenolic resin, the flame retardancy increases, and improved safety during driving can be achieved even when heat is generated by Joule heat when an electric current flows in the coil (the pair of coils 61 and 62) held by coil holding part 42. Further, since the dimensional accuracy increases and the positional accuracy of the coil (the pair of coils 61 and 62) increases, variations in vibration characteristics can be reduced.

As illustrated in FIGS. 3 and 9, coil holding part 42 includes: tubular main body part 422; flange parts 426 to 428; routing part 41 including terminal drawing part 46 and communication groove part 47; and engagement protrusion parts 44 and 45. Note that, flange parts 426 to 428 are disposed at a predetermined interval in the outer peripheral surface of tubular main body part 422 and protrude radially from the outer peripheral surface.

Coil holding part 42 is formed in a coil bobbin shape with tubular main body part 422 and flange parts 426 to 428. Among flange parts 426 to 428, coil holding part 42 includes coil attachment parts 42b and 42c around which the coil (the pair of coils 61 and 62) is wound.

Tubular main body part 422 has a columnar shape and includes inner peripheral surface 42a that is located inward in the radial direction of the pair of coils 61 and 62 and faces outer peripheral surface 20a of movable body 20 at a predetermined interval (gap G). Inner peripheral surface 42a is flat in the axial direction (vibration direction) such that gap G is maintained to have a constant width in the axial direction even when movable body 20 moves or even when movable body 20 does not move, and inner peripheral surface 42a can be said to be a flat peripheral surface without unevenness. That is, gap G is an interval that allows, when movable body 20 moves in the vibration direction, movable body 20 to move without coming into contact with inner peripheral surface 42a.

Inner peripheral surface 42a is configured to be flat in the axial direction such that inner peripheral surface 42a and outer peripheral surface 20a of movable body 20 maintain generation of a straight pipe loss to a fluid over the entire movable field of movable body 20.

Tubular main body part 422 is located between magnet 21 and the pair of coils 61 and 62 to thereby inhibit magnet 21 from coming into contact with the pair of coils 61 and 62. Tubular main body part 422 guides movable body 20 such that movable body 20 can reciprocate along inner peripheral surface 42a.

That is, at the time of driving of movable body 20, tubular main body part 422 functions as a protection wall part that protects movable body 20 against colliding with the pair of coils 61 and 62. Even when movable body 20 in motion comes into contact with tubular main body part 422, the thickness of tubular main body part 422 has a strength that does not cause the pair of coils 61 and 62 on the outer periphery side to be affected.

Coil attachment parts 42b and 42c are provided in a recessed shape in the outer peripheral surface of tubular main body part 422.

Specifically, coil attachment parts 42b and 42c (see FIG. 9) are formed, with the outer peripheral surface of tubular main body part 422 and flange parts 426 to 428, so as to open from the outer peripheral surface of tubular main body part 422 to the outer periphery side, to an outer side of tubular main body part 422 in the radial direction.

Coil attachment parts 42b and 42c are provided so as to be partitioned by flange parts 426 to 428. The pair of coils 61 and 62 is wound around coil attachment parts 42b and 42c. The pair of coils 61 and 62 is wound between flange parts (which may also be referred to as "end flange parts") 427 and 428 so as to hold flange part 426 in the center (which may also be referred to as "center flange part" 426 hereinafter) between the pair of coils 61 and 62.

Coils 61 and 62 in coil attachment parts 42b and 42c are disposed at positions side by side in the coil axial direction so as to surround the outer peripheral surface of first yoke 23 and second yoke 25 of movable body 20 (the outer peripheral surface of a part of magnet 21, the outer peripheral surface of first yoke 23, and the outer peripheral surface of second yoke 25). That is, at the time of no energization, the length of the pair of coils 61 and 62 in the vibration direction is longer than the length of first yoke 23 and second yoke 25, which hold magnet 21 therebetween, in the vibration direction, and the pair of coils 61 and 62 is disposed so as to cover first yoke 23, second yoke 25, and magnet 21.

Center flange part 426 is formed in an annular shape protruding from the outer peripheral surface of tubular main body part 422 outward in the radial direction, and includes an outer periphery part having an annular shape. Note that, a part of the outer periphery part of center flange part 426 is provided with routing part 41 that routes a winding wire.

The diameter of center flange part 426 excluding terminal drawing part 46, that is, the diameter of outer periphery part 426a is smaller than the maximum diameter of the other flange parts (end flange parts 427 and 428). That is, the outer peripheral surface that is an end surface of outer periphery part 426a of center flange part 426 is smaller in diameter than the outer peripheral surface of end flange parts 427 and 428 and is disposed at a position retracted from the outer ends of end flange parts 427 and 428. Note that, as illustrated in FIGS. 5, 6 and 9, the outer peripheral surface of center flange part 426, and parts of end flange parts 427 and 428 configure recessed part 420 (to be detailed later) in which outer yoke 50 is fitted. Coil attachment parts 42b and 42c are covered with outer yoke 50.

Routing part 41 processes, with terminal drawing part 46, the terminal (winding wire 63) of coils 61 and 62 to a state in which the terminal is connectable to the external apparatus, and communication groove part 47 guides winding wire 64 of the coil into coil attachment parts 42b and 42c. Thus, the winding wire (for example, winding wire 64) of the coil is routed into coil attachment parts 42b and 42c such that coil holding part 42 suitably holds coils 61 and 62.

Terminal drawing part 46 includes terminal tying part 43. As illustrated in FIGS. 5 and 9, terminal tying part 43 functions as a connector connection part that ties winding wire 63 of the end part of the winding wire that communicate between the pair of coils 61 and 62 and connects winding wire 63 to the external apparatus. Terminal tying part 43 connects the pair of coils 61 and 62 to the external apparatus (other than the main body part of the vibration actuator; for example, a power supply part such as a driving control part), and enables power from the external apparatus to be supplied to the pair of coils 61 and 62.

Terminal tying part 43 is a conductive member projected from the outer periphery part of coil holding part 42, specifically tubular main body part 422. Terminal tying part 43 includes a rod-shaped body for tying the winding wire of the coil.

Terminal tying part 43 is provided by pressing a base end part into terminal drawing part 46 projected from the outer periphery part of coil holding part 42, specifically the outer peripheral surface of center flange part 426 of coil holding part 42. Winding wire 63 of the end part of the winding wire that configures coil 61 or 62 is tied and connected to terminal tying part 43, and winding wire 63 is electrically securely joined to terminal tying part 43 via fillet 432 formed by soldering.

Terminal drawing part 46 protrudes from the outer peripheral surface of center flange part 426 to thereby be provided at center flange part 426 with terminal drawing part 46 having a predetermined length in the radial direction, a thickness in the vibration direction, and a width along the circumferential direction, and terminal drawing part 46 ensures a press-in margin for terminal tying part 43. The width of terminal drawing part 46 is parallel to the tangent to the outer periphery of center flange part 426. In the present embodiment, terminal drawing part 46 is formed in a cuboid shape, and terminal tying part 43, that is, both the end parts of coils 61 and 62 are projected from a leading-end surface of terminal drawing part 46.

Since terminal drawing part 46 ensures the press-in margin when terminal tying part 43 is fixed by pressing-in, hold terminal tying part 43 can be firmly held, and when terminal tying part 43 is assembled to coil holding part 42, terminal tying part 43 can be stably fixed.

Terminal drawing part 46 draws out an end part of a winding wire of a coil that forms the coil (the pair of coils 61 and 62) to outside vibration actuator 1 via terminal tying part 43 and causes the end part to be connected to a supply power source. Terminal drawing part 46 is inserted through outer yoke 50 to expose terminal tying part 43 to outside outer yoke 50 and further to outside case 10.

Terminal tying part 43 is provided in terminal drawing part 46. Accordingly, even in a case where, when terminal drawing part 46 is inserted through outer yoke 50, outer yoke 50 comes into contact with terminal drawing part 46 and a load of outer yoke 50 is applied to terminal drawing part 46, terminal drawing part 46 can receive the load. Thus, a load when outer yoke 50 is attached can be prevented from being applied to terminal tying part 43, deformation of terminal tying part 43 due to a load applied to terminal tying part 43 can be prevented, and the vibration actuator can be stably manufactured. Note that, the outer peripheral surfaces, which have the same outer diameter, of flange parts 426 to 428 may be provided with an adhesion part and outer yoke 50 may be fastened to each of flange parts 426 to 428 via the adhesion part. Thus, more stable vibration characteristics can be realized.

Winding wire 64 of the coil that communicates the coil (the pair of coils 61 and 62) is inserted through communication groove part 47. In communication groove part 47 of the present embodiment, the winding direction of the winding wire of the coil that forms coils 61 and 62 are inverted so as to be opposite directions above and below communication groove part 47.

Communication groove part 47 is formed so as to open outward in the radial direction in the outer periphery part of center flange part 426 and to penetrate along the vibration direction. Specifically, communication groove part 47 includes: a bottom wall part that forms a bottom having a groove shape; and a side wall part (one side wall part) far from terminal tying part 43 in the bottom wall part.

Communication groove part 47 is covered with outer yoke 50 at center flange part 426. Even in a state in which communication groove part 47 is covered with outer yoke 50, communication groove part 47 communicates, inward in the radial direction of outer yoke 50, coil attachment parts 42b and 42c with each other in the vibration direction. Communication groove part 47 is disposed close to or adjacent to terminal drawing part 46.

As illustrated in FIGS. 5 and 9, communication groove part 47 is a notch-shaped portion that is formed adjacent to terminal drawing part 46 and includes an inclined bottom surface between parallel wall surfaces. The notch-shaped portion has a function of locking, when one of coils 61 and 62 is wound and disposed and then the other one of coils 61 and 62 is wound and disposed after switching the winding direction to the opposite direction, the winding wire such that the winding wire is not detached. Communication groove part 47 in the present embodiment is formed in a U-shape in plan view in which both the side wall parts are erected at both the ends of the bottom wall part as the bottom surface, where both the ends are at a distance from each other in the circumferential direction.

Thus, when the pair of coils 61 and 62 is disposed by winding the winding wire of the coil around coil attachment parts 42*b* and 42*c* in vertically inverted directions, winding wire 64 of the coil securely engages with communication groove part 47 and remains therein so as not to be detached from communication groove part 47. Thus, winding wire 64 of the coil is suitably guided from one of coil attachment parts 42*b* and 42*c* to the other one thereof by communication groove part 47. Accordingly, the pair of coils 61 and 62 can be easily assembled to coil holding part 42 by one winding wire of the coil.

Note that, routing part 41 includes coil guide part 412 in at least one surface of the upper and lower surfaces of center flange part 426 (the surfaces at a distance from each other in the vibration direction). The coil guide part guides winding wire 63 of the coil from terminal tying part 43 to the first winding position (for example, a corner part) of a coil-wound portion (one of coil attachment parts 42*b* and 42*c*) of coil holding part 42. In the present embodiment, in the upper and/or lower surface(s) of center flange part 426, the coil guide part is formed in a step shape in an upper surface portion and a lower surface portion, respectively. The upper surface portion is adjacent to terminal drawing part 46 at one end in the circumferential direction and extends to communication groove part 47. The lower surface portion is in terminal drawing part 46. The coil guide part is a step provided in the upper and/or lower surface(s) (the surface(s) in the vibration direction) of center flange part 426, and the step is formed so as to be retractably guide the winding wire of the coil from terminal tying part 43 to a side of the bottom surface of coil attachment part 42*b* or 42*c*, that is, to a side of the outer peripheral surface of tubular main body part 422.

End flange parts 427 and 428 are disposed at both the end parts of tubular main body part 422, which are at a distance from each other in the axial direction of tubular main body part 422, and configure the upper and lower end parts of coil holding part 42.

End flange parts 427 and 428 (which may also be collectively referred to as "both end flange parts") are provided to protrude radially from the outer periphery of tubular main body part 422 to both the end parts thereof in the vibration direction, respectively. The outer periphery part of each of end flange parts 427 and 428 and outer periphery part 426*a* of center flange part 426 include the same diameter portion. In other words, steps each of which includes a surface flush with the outer surface of center flange part 426 are provided in an opening edge part of coil attachment part 42*b* on the upper side in the vibration direction, where the opening edge part is configured by end flange part 427, and in an opening edge part of coil attachment part 42*c* on the lower side in the vibration direction, where the opening edge part is configured by end flange part 428.

The step surfaces of the steps are located to be flush with the outer peripheral surface of center flange part 426, and thus, end flange parts 427 and 428 configure the same diameter portion of outer periphery part 426*a* of center flange part 426.

These step surfaces and the outer peripheral surface of coil holding part 42 configure recessed part 420 that opens outward in the radial direction and has a recessed shape. Outer yoke 50 fits to recessed part 420, and thus, outer yoke 50 is located in coil holding part 42 such that the outer surface of outer yoke 50 is flush with the outer surfaces of end flange parts 427 and 428.

Outer yoke 50 is disposed in recessed part 420 described above, and thus, outer yoke 50 is positioned at a position surrounding the pair of coils 61 and 62. Further, outer yoke 50 is stably fixed to coil holding part 42 by abutting on outer periphery part 426*a* and the portions of end flange parts 427 and 428, where the portions have the same diameter as the outer diameter of center flange part 426. Thus, even in a case where the height dimension (the length in the vibration direction) of outer yoke 50 is large, outer yoke 50 can be stably fixed by a way of attachment corresponding thereto.

End flange parts 427 and 428 are formed in a columnar shape, each opening in a direction away from center flange part 426, for example, in the up-down direction. Elastic support parts 81 and 82 are fixed to end flange parts 427 and 428 at the end parts on the opening sides, that is, the upper and lower end parts.

End flange parts 427 and 428 each include: an annular surface which is horizontal and in which an opening part that opens in the up-down direction extends from the upper end of tubular main body part 422 outward in the radial direction; a peripheral surface which rises inclined from the outer edge of the annular surface; and an outer periphery part which rises, parallel to the axial direction, from the end part of the peripheral surface outward in the radial direction. The outer periphery part which rises, parallel to the axial direction, from the end part of the peripheral surface outward in the radial direction is a wall part that partitions opening end part 427*a* or 428*a*.

Engagement protrusion parts 44 and 45 are protruding parts projected in the vibration direction (up-down direction) from the upper and lower end parts of coil holding part 42, that is, opening end parts (each of which may also be referred to as "opening part of coil holding part 42") 427*a* and 428*a* of end flange parts 427 and 428, where opening end parts 427*a* and 428*a* are upper and lower opening end parts of end flange parts 427 and 428 and have a circular shape.

As illustrated in FIGS. 3 and 4, engagement protrusion parts 44 and 45 engage with engagement recesses 127 of lid part 12 of case 10 and with engagement recesses 117 (see FIGS. 10 and 11) of case main body 11. Engagement protrusion parts 44 and 45 engage with engagement recesses 127 and 117 to thereby position coil holding part 42, lid part 12, and case main body 11 in the radial direction and the vibration direction, and also position elastic support parts 81 and 82 in the radial direction, where elastic support part 81 is held between engagement protrusion parts 44 and elastic support part 82 is held between engagement protrusion parts 45.

Engagement protrusion part 44 is disposed so as to face top surface part 122 of lid part 12 and engagement protrusion part 45 is disposed so as to face bottom part 114 of case main body 11. End flange part 427 receives top surface part 122 in a state in which elastic support part 81 is sandwiched, and end flange part 428 receives bottom part 114 in a state in which elastic support part 82 is sandwiched.

Elastic support parts 81 and 82 are positioned with respect to coil holding part 42 by fitting engagement protrusion parts 44 and 45 to positioning groove parts 808. Thus, the positions of elastic support parts 81 and 82 in each individual body of driving unit 15 can be uniformly set, and elastic support parts 81 and 82 can be stably positioned with respect to coil holding part 42. Thus, the movement of elastic support parts 81 and 82 in the rotational direction is restricted, and, as a product, variations in elastic support parts 81 and 82 can be suppressed and stable characteristics can be realized.

A plurality of engagement protrusion parts 44 is provided around the axis of coil holding part 42 at an equal interval and a plurality of engagement protrusion parts 45 is provided around the axis of coil holding part 42 at an equal interval.

Further, the plurality of engagement protrusion parts 44 engages with positioning groove parts 808 of elastic support part 81, and the plurality of engagement protrusion parts 45 engages with positioning groove parts 808 of elastic support part 82. Thus, movable body 20 and coil holding part 42 can be easily positioned by reducing catching and/or friction of elastic support parts 81 and 82 when movable body 20 is inserted into coil holding part 42, and performing the assemblage with good assemblability.

Further, coil holding part 42 is housed in a state of facing an edge part of lid part 12 and an edge part of bottom part 114 by engaging engagement protrusion parts 44 and 45 of the upper and lower end parts of coil holding part 42 with engagement recesses 127 and 117 of case 10, and coil holding part 42 is fixed within the case.

At the time of non-driving, coil holding part 42 supports movable body 20 via elastic support parts 81 and 82 such that both the edge parts of the outer peripheral surface of movable body 20 in the vibration direction protrude in the vibration direction from both the edge parts of inner peripheral surface 42a in the vibration direction. Further, even at the time of driving, coil holding part 42 also supports movable body 20 such that gap G having a constant length (width) in which outer peripheral surface 20a, which has a columnar shape, of movable body 20 extends in the vibration direction with respect to inner peripheral surface 42a is formed.

<Coils 61 and 62>

In vibration actuator 1, with the axial direction of the pair of coils 61 and 62 (the magnetization direction of magnet 21) as the vibration direction, the pair of coils 61 and 62, magnet 21, first yoke 23, and second yoke 25 configure a magnetic circuit used for generating the driving source.

The pair of coils 61 and 62 is energized at the time of driving (vibration), and the pair of coils 61 and 62 and magnet 21 configure a voice coil motor. Note that, although the pair of coils 61 and 62 is used in the present embodiment, one coil or three or more coils may be used as long as a magnetic circuit that is driven in the same manner is configured therewith. Nonetheless, even-numbered coils are preferably used so as to be symmetric in the vibration direction.

The pair of coils 61 and 62 is disposed at positions symmetrically with respect to magnet 21 in the vibration direction with respect to movable body 20 including magnet 21, first yoke 23, second yoke 25, and the like. The center position of the length of the coil in the vibration direction, that is, the center position of the length between the upper end of coil 61 and the lower end of coil 62 is preferably the same position (including substantially the same position) in the vibration direction as the center position of the length of movable body 20 (in particular, magnet 21).

In the present embodiment, the pair of coils 61 and 62 is configured by winding one winding wire of the coil in directions opposite to each other. At the time of energization, an electric current flows through coils 61 and 62 in the opposite directions, respectively.

The respective end parts of the pair of coils 61 and 62, that is, both the end parts of the winding wire of the coil that configures the pair of coils 61 and 62 are tied and connected to terminal tying part 43 of flange part 426.

The pair of coils 61 and 62 is connected to the power supply part (for example, driving control part 203 illustrated in FIGS. 19 and 20) via terminal tying part 43. For example, each end part of the pair of coils 61 and 62 is connected to an AC supply part via terminal tying part 43, and an AC power supply (AC voltage) is supplied from the AC supply part to the pair of coils 61 and 62. Thus, the pair of coils 61 and 62 can generate, between the pair of coils 61 and 62 and the magnet, thrust that allows the pair of coils 61 and 62 and the magnet to move, in the axial directions of the pair of coils 61 and 62 and the magnet, in a direction in which the pair of coils 61 and 62 and the magnet approach each other or in a direction in which the pair of coils 61 and 62 and the magnet are separated from each other.

In the present embodiment, in the pair of coils 61 and 62, a side of the other end part of the winding wire of the coil, of which one end part is tied to one of terminal tying parts 43, is guided to a position of coil attachment part 42b, at which the first winding is formed with the step in coil guide part 412 on a side of coil attachment part 42b as illustrated in FIG. 9. The winding wire is wound counterclockwise at the position of the first winding to form the first winding, and the winding wire is sequentially wound counterclockwise to form coil 62.

Next, the winding wire on a side of the other end part of coil 62 is guided to coil attachment part 42c with communication groove part 47 as described above, and is located at a position of the first winding of coil attachment part 42c after the winding direction is switched to the opposite direction within communication groove part 47. Subsequently, the winding is performed in the direction opposite to that for coil attachment part 42b. In the present embodiment, the winding is performed clockwise. Thus, coil 61 is formed within coil attachment part 42c. Note that, although the coil (the pair of coils 61 and 62) is configured with one winding wire in the present embodiment, the present invention is not thereto, and the coil may be configured with separate coils (the pair of coils 61 and 62). In this configuration, in a case where the separate coils are configured by winding winding wires in the same direction, electric currents in directions different from each other are supplied at the time of driving.

Note that, the coil axis of the pair of coils 61 and 62 is preferably disposed coaxially with the axis of coil holding part 42 or the axis of magnet 21.

In vibration actuator 1, the pair of coils 61 and 62 is formed in a columnar shape by winding the winding wire of the coil around coil attachment parts 42b and 42c from outside coil holding part 42. Thus, coils 61 and 62 can be assembled without using a self-bonding wire, and a cost reduction of the coil (the pair of coils 61 and 62) itself and further a cost reduction of the entire vibration actuator are realized.

<Outer Yoke 50>

Outer yoke 50 is a magnetic substance having a tubular shape and, as illustrated in FIGS. 3 to 5, is disposed at a position at which outer yoke 50 surrounds the outer peripheral surface of coil holding part 42 and covers the pair of coils 61 and 62 on an outer side in the radial direction.

As described above, outer yoke 50 and the pair of coils 61 and 62 configure the magnetic circuit on the side of the fixing body, and outer yoke 50 and the magnetic circuit on the side of the movable body, that is, magnet 21, first yoke 23, and second yoke 25, configure a magnetic circuit. Outer yoke 50 prevents leakage flux outside vibration actuator 1 in the magnetic circuit.

In the magnetic circuit, outer yoke 50 can increase the electromagnetic conversion efficiency by increasing the thrust constant. Outer yoke 50 has a function as a magnetic spring together with magnet 21 by utilizing the magnetic attraction force of magnet 21, can reduce stresses on elastic support parts 81 and 82 when elastic support parts 81 and 82 are machine springs, and can improve the durability of elastic support parts 81 and 82.

In vibration actuator 1, when coils 61 and 62 are energized via terminal tying part 43, movable body 20 reciprocates in the vibration direction within case 10 by cooperation of coils 61 and 62 and magnet 21.

Outer yoke 50 is disposed at a position at which the center of the length of outer yoke 50 in the vibration direction has the same height as the center of magnet 21 in the vibration direction, where the magnet 21 is disposed inside outer yoke 50. The shield effect of outer yoke 50 described above makes it possible to achieve a reduction in leakage flux outside the vibration actuator.

Both the end parts of outer yoke 50, which are at a distance from each other in the vibration direction, are located at positions lower than each of both the end parts of movable body 20 in the vibration direction when movable body 20 moves. That is, outer yoke 50 is configured to have, in the vibration direction, a length that covers both the end parts of the movable field of a stacked body, in which magnet 21, first yoke 23, and second yoke 25 are stacked, in the vibration direction.

Outer yoke 50 includes yoke main body 51, and opening part 53 provided in a center part of yoke main body 51 in the vibration direction.

Yoke main body 51 is a magnetic substance formed in a columnar shape and is formed of, for example, a SECC (electrogalvanized steel sheet) excellent in weldability and corrosion resistance.

In the present embodiment, yoke main body 51 has flexibility and includes a slit parallel to the axial direction in a part of the peripheral wall. Yoke main body 51 has a C-like columnar shape in plan cross-sectional view. When yoke main body 51 is attached to the outer periphery of coil holding part 42, the distance between end parts 52 that configure the slit portion of yoke main body 51 is widened and coil holding part 42 is disposed inside yoke main body 51. Next, the deformation of yoke main body 51 is restored and yoke main body 51 is fitted to recessed part 420 of the outer periphery of coil holding part 42, and thus, yoke main body 51 is externally attached to coil holding part 42.

Opening part 53 allows a wire connecting the external apparatus and coils 61 and 62 to pass therethrough. Note that, opening part 53 is provided in a center part of the slit portion of yoke main body 51 so as to extend in the circumferential direction. Upper and lower side parts that partition opening part 53 are formed of end parts 52 that extend in the circumferential direction so as to face each other in the circumferential direction in yoke main body 51.

Terminal drawing part 46 is inserted into opening part 53. Thus, terminal tying part (wire part) 43 that is connected to coils 61 and 62 is disposed within opening part 53. In driving unit 15, terminal tying part (wire) 43 is disposed in a state of protruding and being exposed outside outer yoke 50 such that terminal tying part (wire) 43 can be connected to the external apparatus.

Further, opening part 53 has a function as a stopper for stopping the rotation of outer yoke 50 in the circumferential direction with respect to coil holding part 42 by being fitted to terminal drawing part 46.

In outer yoke 50, the left and right side parts that partition opening part 53 in the circumferential direction may be formed to be located at positions at which the left and right side parts hold terminal drawing part 46 therebetween.

<Elastic Support Parts 81 and 82>

Elastic support parts 81 and 82 illustrated in FIGS. 3 to 7 support movable body 20 with respect to fixing body 40 such that movable body 20 is reciprocatable in the vibration direction.

Elastic support parts 81 and 82 hold movable body 20 therebetween in the vibration direction of movable body 20, and are provided in a hanging manner so as to intersect both movable body 20 and fixing body 40 in the vibration direction.

In the present embodiment, elastic support parts 81 and 82 are attached parallel to each other across both the end parts (the upper and lower end parts) of coil holding part 42, which are at a distance from each other in the vibration direction, and across both the end parts of the movable body, respectively, as illustrated in FIGS. 3 and 7.

Elastic support parts 81 and 82 are formed in a circular plate shape in which inner periphery part 802 having an annular shape and serving as an inner-side spring end part and outer periphery part 806 having an annular shape and serving as outer-side spring end part are joined by deformation arm 804 that is elastically deformed and has an arc shape in plan view.

Deformation arm 804 is disposed in a spiral shape connecting inner periphery part 802 and outer periphery part 806. Inner periphery part 802 and outer periphery part 806 are relatively displaced in the axial direction by deformation of deformation arm 804.

Elastic support parts 81 and 82 movably supports movable body 20 in the axial direction (vibration direction) such that movable body 20 does not come into contact with fixing body 40.

Each of elastic support parts 81 and 82 is a plurality of leaf springs having a flat plate shape. Movable body 20 is supported by a pair of elastic support parts 81 and 82 as a plurality of elastic support parts, but may be configured to be supported by three or more leaf springs. The plurality of leaf springs described above is attached along the direction orthogonal to the vibration direction.

Even when movable body 20 is driven (vibrated) or even in a case where an external impact is received, elastic support parts 81 and 82 are not damaged since movable body 20 comes into contact with inner peripheral surface 42a of tubular main body part 422 and does not come into contact with the pair of coils 61 and 62. Further, elastic support parts 81 and 82 may be configured with anything as long as elastic support parts 81 and 82 movably elastically support movable body 20. In the present embodiment, elastic support parts 81 and 82 are members having the same configuration.

Inner periphery part 802 includes connection hole 802a disposed in a center of elastic support parts 81 and 82. Each of both the end parts of movable body 20, which are at a distance from each other in the vibration direction, is connected to connection hole 802a by fitting. Specifically, each of spring fixing part 274 of weight part 27 and spring fixing part 294 of weight part 29 is inserted into inner periphery part 802, and inner periphery part 802 is held between the weight part of the spring fixing part and the flange part.

On the other hand, outer periphery parts 806 are attached to the upper and lower end parts of coil holding part 42, that is, opening end parts 427a and 428a of end flange parts 427 and 428. Outer periphery parts 806 may be fixed to opening end parts 427a and 428a of end flange parts 427 and 428 by being bonded or the like to opening end parts 427a and 428a with an adhesive or the like. Further, outer periphery parts 806 may be held and fixed between opening end part 427a and positioning step part 128 on a side of case 10 and between opening end part 428a and positioning step parts 118 on a side of case 10 in a state in which engagement protrusion parts 44 and 45 are positioned by being engaged with positioning groove parts 808, respectively. In the present embodiment, outer periphery parts 806 are fixed in a state of being held and between opening end part 427a and positioning step part 128 on the side of case 10 and between opening end part 428a and positioning step part 118 on the side of case 10.

The leaf springs as elastic support parts 81 and 82 may be formed of any elastically deformable materials, and may be formed by sheet metal processing using a stainless-steel sheet, phosphor bronze, or the like. In the present embodiment, elastic support parts 81 and 82 are thin flat-plate disk-shaped spiral springs formed of phosphor bronze having high workability, excellent corrosion resistance, high tensile strength, and high wear resistance. Further, when elastic support parts 81 and 82 are formed of a non-magnetic substance such as phosphor bronze, the magnetic flux flow of the magnetic circuit is not disrupted at all. Elastic support parts 81 and 82 may be formed of a resin as long as elastic support parts 81 and 82 support movable body 20 such that movable body 20 is vibratable. Further, since elastic support parts 81 and 82 have a flat plate shape, it is possible to achieve improved positional accuracy, that is, improved processing accuracy in comparison with cone shaped springs.

In the present embodiment, the plurality of elastic support parts 81 and 82 is joined to coil holding part 42 and movable body 20 with the same spiral orientation.

In the present embodiment, in elastic support parts 81 and 82, attenuation part 88 that attenuates a vibration occurring in elastic support parts 81 and 82 is attached to deformation arm 804 or to deformation arm 804 and outer periphery part 806.

As described above, in the present embodiment, a plurality of leaf springs having a spiral shape as the plurality of elastic support parts 81 and 82 is used in the same spiral orientation, is attached to both the end parts, which are at a distance from each other in the vibration direction, of movable body 20, respectively, and elastically supports movable body 20 with respect to fixing body 40.

Thus, when the movement amount of movable body 20 increases, the movable body moves, while rotating slightly, in the translation direction (for example, a direction on a plane perpendicular to the vibration direction). When the spiral directions of the plurality of leaf springs are opposite directions, the plurality of leaf springs moves in the buckling direction or the tensile direction, and smooth movement thereof is hindered.

Elastic support parts 81 and 82 in the present embodiment are fixed to movable body 20 so as to have the same spiral orientation. Accordingly, even when the movement amount of movable body 20 increases, elastic support parts 81 and 82 can smoothly move along the vibration direction, that is, can be deformed. Thus, the amplitude becomes larger and the vibration output can be increased. Having said that, the spiral directions of the plurality of elastic support parts 81 and 82 may be designed to be directions opposite to each other in accordance with a desired movable range of movable body 20.

Elastic support parts 81 and 82 having a plate shape are joined to movable body 20 by fitting inner periphery parts 802 of elastic support parts 81 and 82 to spring fixing parts 274 and 294 that configure the end parts of movable body 20 in the vibration direction. Note that, an adhesive or the like may be applied to spring fixing parts 274 and 294 and spring fixing parts 274 and 294 may be joined to inner periphery parts 802. At that time, spring fixing parts 274 and 294 may be firmly joined to inner periphery parts 802 via the adhesive accumulated in notches formed in an arc shape around inner periphery parts 802.

Further, on opening end part 427a, which has an annular shape, of end flange part 427, outer periphery part 806 of elastic support part 81 is positioned and fixed to a portion that avoids engagement protrusion part 44. On opening edge surface 428a, which has an annular shape, of end flange part 428, on the other hand, outer periphery part 806 of elastic support part 82 is positioned and fixed to a portion that avoids engagement protrusion part 45.

As described above, elastic support parts 81 and 82 are held, in a state of being disposed in the direction orthogonal to the vibration direction, between opening end parts 427a and 428a as the upper and lower opening edge parts of coil holding part 42 and lid part 12 and bottom part 114 of case 10.

Further, elastic support parts 81 and 82 are attached to coil holding part 42 and movable body 20 housed inside coil holding part 42 so as to close the upper and lower openings of coil holding part 42 around which the pair of coils 61 and 62 is wound on the outer circumference side.

Elastic support parts 81 and 82 are joined to movable body 20 by caulking connection holes 802a of inner periphery parts 802 to spring fixing parts 274 and 294 of weight parts 27 and 29 of the upper and lower end parts of movable body 20. Then, positioning groove parts 808 are engaged with engagement protrusion parts 44 and 45, and outer periphery parts 806 abut on and are fixed to opening end parts 427a and 428a of coil holding part 42. In this way, driving unit 15 in which the positional relationship between the coil (the pair of coils 61 and 62) and movable body 20 is defined is configured, and is easily disposed within case 10.

<Attenuation Part (Damper) 88>

Attenuation part 88 is attached to elastic support parts 81 and 82, suppresses a resonance peak due to elastic support parts 81 and 82, and generates a stable vibration over a wide range.

In a case where movable body 20 supported via elastic support parts 81 and 82 is in a state of being disposed with the position of the central axis of movable body 20 being deviated within coil holding part 42, that is, an axis deviation occurs, it is assumed that gap G narrows, and that gap G does not have a constant width in the radial direction in the entire circumference of movable body 20. However, attachment of attenuation part 88 to elastic support parts 81 and 82 makes it possible to adjust axis deviation and to cause movable body 20 to suitably move.

Attenuation part 88 is, for example, an elastic member, such as an elastomer, which is formed in an H-cross-sectional shape including: a pair of flanges that is disposed to face each other in parallel and holds elastic support part 81 or 82 therebetween; and a rib (push-in part) that couples center parts of the flanges to each other. Attenuation part 88 is disposed in contact with both bridge portions of elastic support part 81 as a leaf spring, which are outer periphery part 806 and deformation arm 804 in the present embodiment, by inserting an elastomer between the bridge portions. A plurality of attenuation parts 88 is attached, but not fastened, to elastic support part 81.

Attenuation part 88 attenuates a sharp spring resonance in elastic support parts 81 and 82 and prevents a large difference in vibrations due to frequencies by a significantly increased vibration near the resonance frequency.

Thus, even in a case where movable body 20 vibrates such that elastic support parts 81 and 82 are plastically deformed, it is possible to cause movable body 20 to vibrate such that movable body 20 does not come into top surface part 122 and bottom part 114 before the plastic deformation, and no abnormal noise due to movable body 20 coming into contact with top surface part 122 and bottom part 114 occurs. Note that, attenuation part 88 may be formed in any shape, of any material, or the like, as long as attenuation part 88 prevents generation of a sharp vibration in elastic support parts 81 and 82.

<Case 10>

Figure 10:
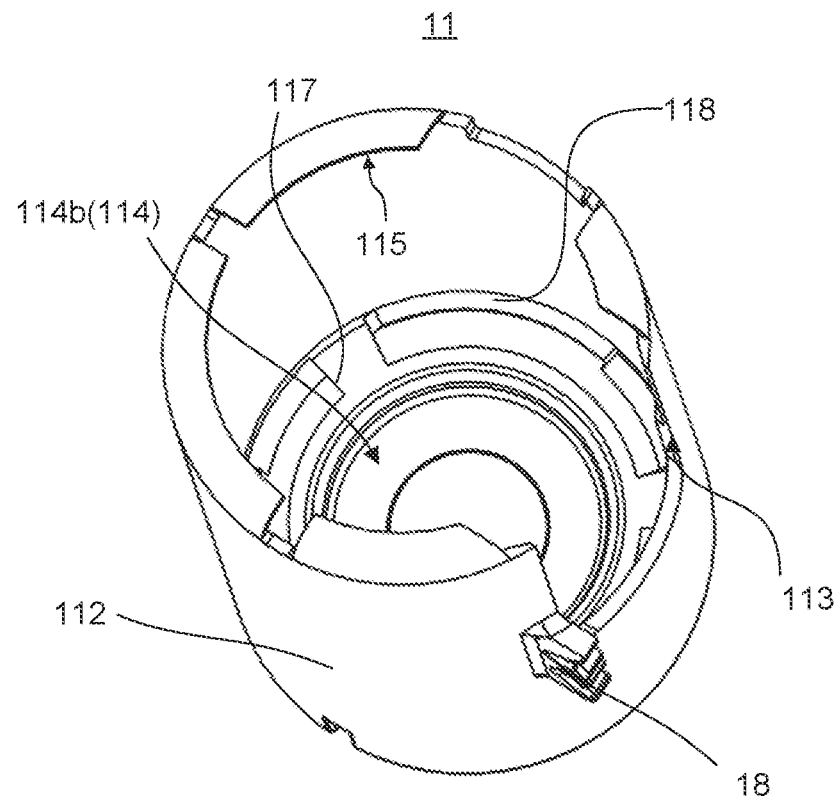
FIG. 10 is a perspective view of an internal structure of the case.
Figure 11:
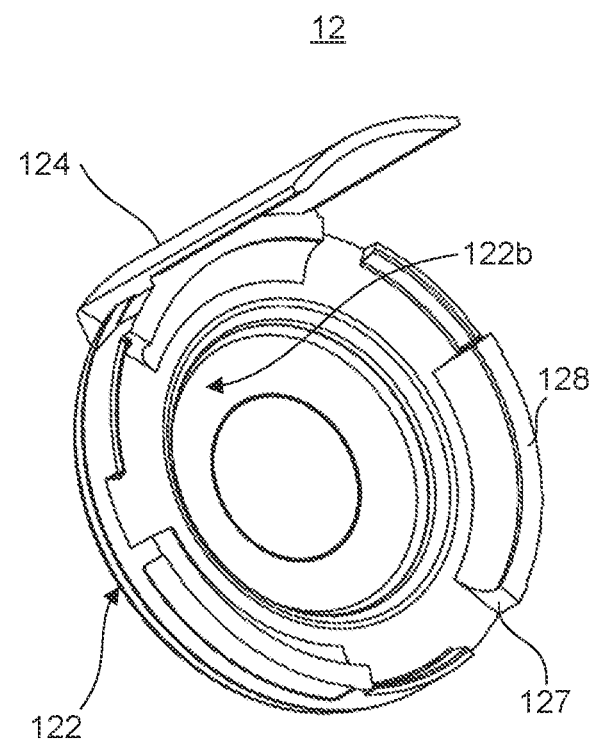
FIG. 11 is a perspective view of a rear surface of a lid body.

FIG. 10 is a top surface-side perspective view of case main body 11, and FIG. 11 is a bottom surface-side perspective view of lid part 12.

As illustrated in FIGS. 1 to 3, 10, and 11, case 10 houses driving unit 15 by closing opening part 115 of case main body 11 having a bottomed tubular shape with lid part 12. Case 10 is formed of, for example, a resin such as PBT. Case main body 11 and lid part 12 may be resin-molded products such as PBT.

Case main body 11 includes: peripheral wall part 112 having a tubular shape; bottom part 114 that closes one opening of peripheral wall part 112; and wire holding part 18. Peripheral wall part 112 is provided with notch 113 having a shape obtained by notching a side of opening part 115 which is the other opening.

Lid part 12 and bottom part 114 in case 10 configure top surface part 122 and a lower surface part (bottom part 114) of vibration actuator 1 in the present embodiment, and are disposed to face movable body 20 of driving unit 15 at a predetermined interval in the vibration direction of movable body 20. Lid part 12 includes downwardly extending part 124 that is provided extending downward from a part of the outer periphery part of top surface part 122 and engages with notch 113 of case main body 11. Note that, since case 10 is made of a resin, lid part 12 is joined to case main body 11 by welding and caulking the opening edge part of case main body 11. Note that, FIG. 10 illustrates the caulked opening edge part of case main body 11 having a bent shape.

Lid part 12 and bottom part 114 define the maximum movable range of movable body 20 within driving unit 15. Top surface part 122 of lid part 12 and the rear surface of bottom part 114 of case main body 11 are provided with recesses 122b and 114b having a cone shape (inverted frustoconical shape), respectively. The inclined peripheral surfaces of recesses 122b and 114b are formed along the deformation states of elastic support parts 81 and 82.

Recess 122b of top surface part 122 and recess 114b of bottom part 114 define an inner space of lid part 112 and bottom part 114 within case 10, that is, a movement space outward in the vibration direction from elastic support parts 81 and 82 that hold movable body 20 therebetween, and prevent plastic deformation of elastic support parts 81 and 82.

Accordingly, even in a case where a force exceeding the movable range is applied to movable body 20, elastic support parts 81 and 82 come into contact with fixing body 40 (at least one of lid part 12 and bottom part 114) before being plastically deformed. Note that, the movable range is wider in the axial direction (vibration direction) than the movable field of movable body 20.

Recesses 122b and 114b defines, together with the inner space of lid part 112 and bottom part 114 and an inner space of end flange parts 427 and 428 of driving unit 15, movable spaces GS1 and GS2 of movable body 20 and elastic support parts 81 and 82. Movable spaces GS1 and GS2 have a plane-symmetrical shape with respect to a normal section through a center position of movable spaces GS1 and GS2 in the axial direction. That is, the fluid housing capacities of movable spaces GS1 and GS2 are configured to be substantially the same.

Further, movable spaces GS1 and GS2 are hermetically sealed spaces, but may be provided with a minimum hole(s) for exhibiting an air attenuation effect due to a pipe resistance, such as elimination of a difference in pressure between inside and outside vibration actuator 1. Such a minimum hole(s) may be formed in joined portions at which outer periphery parts 806 of elastic support parts 81 and 82 are bonded to coil holding part 42 or positioning step parts 128 and 118.

Note that, the ratio of the volume occupied by movable body 20 to the entire volume including movable spaces GS1 and GS2 and an inner space inside tubular main body part 422 of fixing body 40 is preferably substantially 50%, more preferably a good 50%.

In the inner space inside case 10, movable spaces GS1 and GS2 are formed between outer peripheral surface 20a of movable body 20 and inner peripheral surface 42a of coil holding part 42, and are connected to both the end parts of gap G having a columnar shape and a constant width over the entire circumference of outer peripheral surface 20a.

In fixing body 40, movable spaces GS1 and GS2 are a pair of fluid housing chambers communicating with gap G at both the end parts of fixing body 40 in the axial direction of movable body 20, and store and house air as a fluid.

As illustrated in FIG. 3, movable spaces GS1 and GS2 are provided so as to steeply expand in diameter with respect to inner peripheral surface 42a.

Figure 12:
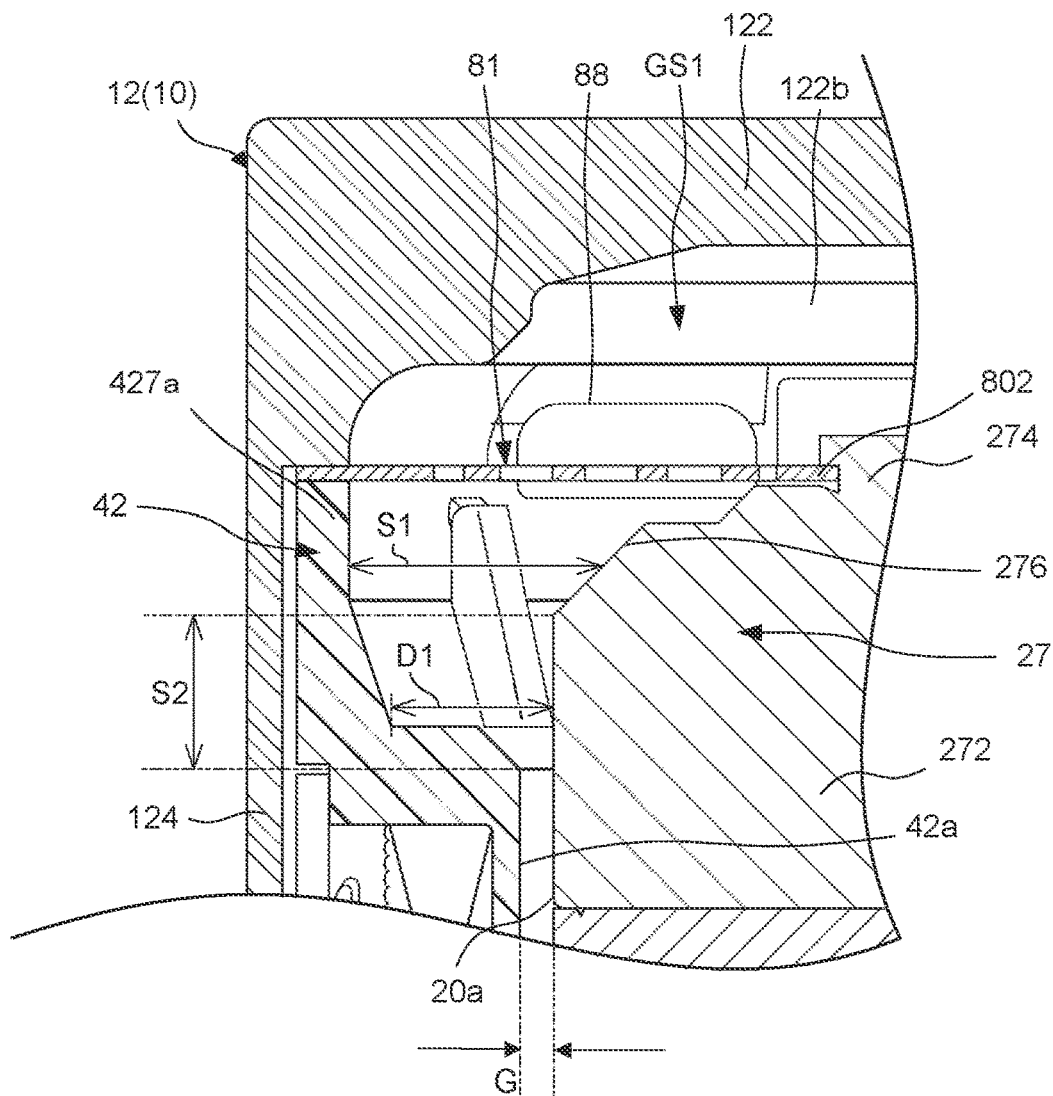
FIG. 12 is a partially enlarged cross-sectional view provided for describing a gap and a movable space.

FIG. 12 is a partially enlarged cross-sectional view provided for describing gap G and movable spaces GS1 and GS2.

As illustrated in FIG. 12, movable space GS1 is formed so as to be located at a position at which the inner peripheral surface on a side of the fixing body steeply expands in diameter (indicated by D1) from the width of gap G.

Thus, within case 10, movable spaces GS1 and GS2 having a larger outer diameter than gap G are connected to both the end parts of gap G having a tubular shape and extending in the axial direction to thereby form the movable field of movable body 20. Note that, movable spaces GS1 and GS2 also have a diameter portion (radial portion of space S1) whose length is equal to or greater than the length of outer diameter D1. Details of the function of movable spaces GS1 and GS2 when movable body 20 moves will be described later together with gap G.

Note that, as illustrated in FIG. 12, space S1 between chamfered part 276 and the opening part (opening end part 427a) of coil holding part 42, which faces chamfered part 276 outward in the radial direction (the direction orthogonal to the axial direction), is greater than the diameter of recess 112b of movable space GS1. Thus, space S1 becomes a space bulging outward from movable body 20, and can let out and store air in recess 114b when weight part 27 of movable body 20 moves to a side of recess 114b.

Further, when movable body 20 does not move, gap G is smaller than length S2 of a portion protruding from inner peripheral surface 42a to a side of the opening, where outer peripheral surface 20a of movable body 20 and inner peripheral surface 42a are disposed to face each other in parallel.

Note that, as illustrated in FIG. 10, on a side of the inner surface of bottom part 114, positioning step part 118 is projected from an outer periphery part of recess 114b, and engagement recess 117 is provided adjacent to positioning step part 118. On the other hand, as illustrated in FIG. 11, on a side of the rear surface of top surface part 122, positioning step part 128 is projected from an outer periphery part of top surface part 122, and engagement recess 127 is provided adjacent to positioning step part 128.

In the present embodiment, terminal drawing part 46 of coil holding part 42 and downwardly extending part 124 are disposed within notch 113 of case 10. Within notch 113, terminal drawing part 46 is located in a center portion of case 10 and is surrounded by peripheral wall part 112 and downwardly extending part 124, and notch 113 is closed. Thus, terminal tying part 43 is disposed in a state of protruding outward from the outer peripheral surface of case 10, and vibration actuator 1 makes it easier to perform connection with the external apparatus via terminal tying part 43.

The thicknesses of bottom part 114 and top surface part 122 are formed so as to be thicker than the thickness of peripheral wall part 112. Thus, even when the movable body or an external member collides therewith by dropping or the like, it is possible to sufficiently withstand the collision. Further, even when a sudden change in pressure in the inner space occurs when movable body 20 moves, it is possible to withstand the sudden change in pressure and improved durability can be achieved.

<Gap G and Movable Spaces GS1 and GS2>

As illustrated in FIG. 3, within case 10, outer peripheral surface 20a of movable body 20 is longer, protruding on the both sides of movable body 20 in the axial direction, than inner peripheral surface 42a of coil holding part 42 over the entire movable field of movable body 20 (movable spaces GS1 and GS2 and a movable body-housing space in the center including gap G). Thus, gap G has a constant width in the axial direction between outer peripheral surface 20a of movable body 20 and inner peripheral surface 42a of coil holding part 42 when movable body 20 does not move, and is maintained constant in the axial direction when movable body 20 moves. Gap G is configured to, for example, maintain the same width when movable body 20 does not move and when movable body 20 moves.

That is, gap G is a space having a tubular shape which has a length (width) in the radial direction as an equal length over the entire circumference of movable body 20 so as to surround the outer periphery of movable body 20 and has this annular width that is uniformly extended in the axial direction (vibration direction).

The pipe resistance generated in such gap G is generated by movement of movable body 20 within coil holding part 42, that is, inside inner peripheral surface 42a. Note that, in the present embodiment, the pipe through which a fluid flows in a pipe resistance corresponds to wall surfaces surrounding gap G, such as inner peripheral surface 42a of coil holding part 42 and outer peripheral surface 20a of movable body 20.

Movement of air in movable spaces GS1 and GS2 at both the end parts of movable body 20 in the vibration direction within case 10, that is, movement of air (liquid) flowing through movable spaces GS1 and GS2 via gap G is suppressed by a pipe resistance. The pipe resistance causes air attenuation to act on the air over the entire movable field of the movable body within case 10 and exhibits an air attenuation effect to attenuate the vibration of movable body 20.

As the pipe resistance, there are generally known a straight pipe loss, which is a loss of kinetic energy due to a friction between a pipe and a fluid, an entrance loss due to a difference in pipe shape (a change in a shape of a flow path), an exit loss, a contraction flow loss, a separated flow loss, and the like.

The entrance loss is a loss of kinetic energy that occurs in a case where a fluid flows from a large region into a pipe. In vibration actuator 1, the loss is considered to occur when air flows from movable spaces GS1 and GS2 into gap G.

Further, the exit loss is a loss of kinetic energy that occurs when a fluid flows out from a pipe to a large region. In vibration actuator 1, the loss is considered to occur when air flows out from gap G to movable spaces GS1 and GS2.

The contraction flow loss (contraction loss) is a loss of kinetic energy generated by, in a case where a fluid flows through a pipe whose cross section suddenly contracts, or the like, the flow being contracted and a contraction flow (also referred to as a compression flow) being generated together with a vortex. In vibration actuator 1, the loss is considered to occur when air flows from movable spaces GS1 and GS2 into gap G.

The separated flow loss is a loss of kinetic energy generated by, in a case where a fluid flows through a pipe whose cross section is suddenly enlarged, or the like, a large separation region occurring not in accordance with the shape and a separation flow being generated together with a vortex. In vibration actuator 1, the loss is considered to occur when air flows from gap G into movable spaces GS1 and GS2.

Movable body 20 and fixing body 40, in particular outer peripheral surface 20a and inner peripheral surface 42a are configured to generate a pipe resistance including at least one of these.

<Wire Holding Part 18>

Figure 13:
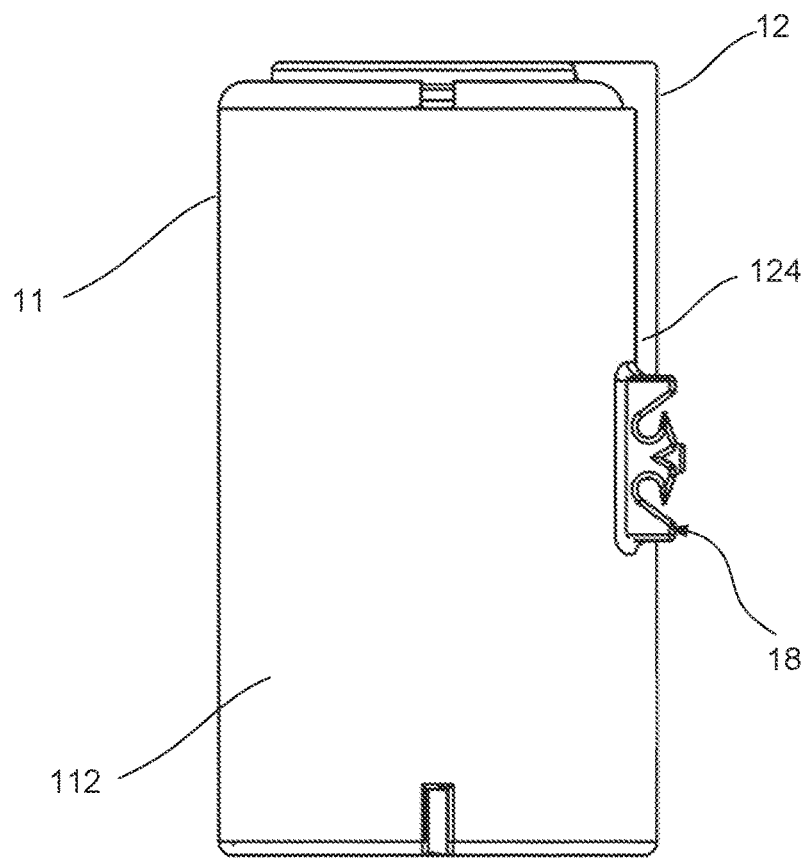
FIG. 13 is a left side view of the vibration actuator provided for describing a wire holding part.
Figures 14A, 14B:
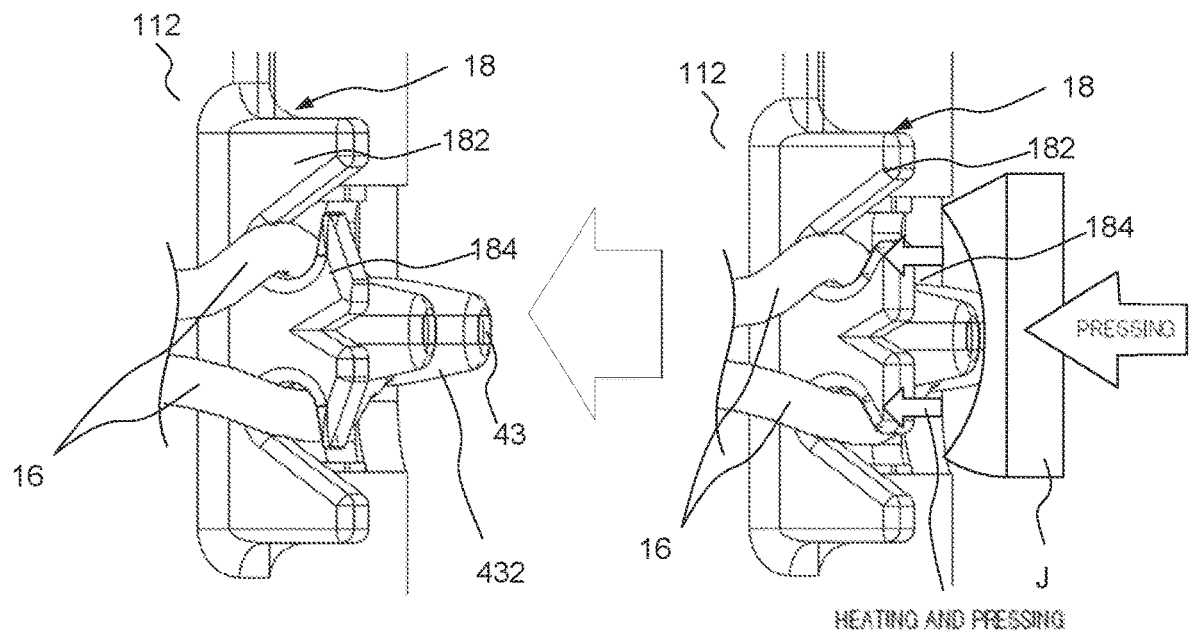
FIGS. 14A and 14B are diagrams provided for describing the wire holding part.

FIG. 13 is a left side view of the vibration actuator provided for describing a wire holding part. FIGS. 14A and 14B are diagrams provided for describing the wire holding part. FIG. 14A is an enlarged perspective view of the wire holding part, and FIG. 14B is a diagram illustrating wire holding part 18 before holding lead wire 16.

Wire holding part 18 illustrated in FIGS. 1 to 3, 13 and 14 holds lead wire 16 electrically connected to coils 61 and 62 of driving unit 15 housed within case 10 such that no external load is applied to connection portions with coils 61 and 62.

Specifically, wire holding part 18 holds lead wire 16 which is introduced from outside and is connected to the winding wire of coils 61 and 62 at terminal tying part 43. Note that, since wire holding part 18 is integrally molded with case main body 11 of case 10, wire holding part 18 is formed of the same material as that of case main body 11, for example, a resin such as PBT.

In the outer surface of case 10, wire holding part 18 is projected, directed outward in the radial direction, from a position along an opening edge part that surrounds notch 113.

Wire holding part 18 is disposed at a position adjacent to terminal tying part 43 of driving unit 15 in the circumferential direction.

As illustrated in FIG. 14A, wire holding part 18 includes: wire insertion part 182 having a recessed shape in which lead wire 16 is fitted and which holds lead wire 16; and wire fixing part 184. Wire insertion part 182 is formed such that lead wire 16 to be inserted is directed linearly without applying a load on terminal tying part 43.

Wire fixing part 184 is formed so as to surround lead wire 16 inserted into wire insertion part 182. Wire fixing part 184 is welded and deformed. That is, as illustrated in FIG. 14B, before the deformation, wire fixing part 184 and wire insertion part 182 form a recessed part through which lead 16 can be inserted. When lead wire 16 is inserted into the above recessed part, jig J is applied, and heating is performed, wire fixing part 184 is deformed and welded, and wire fixing part 184 and wire insertion part 182 hold lead wire 16.

Thus, lead wire 16 can be easily held simply by inserting lead wire 16 into the recessed part and heating wire fixing part 184.

Figure 15:
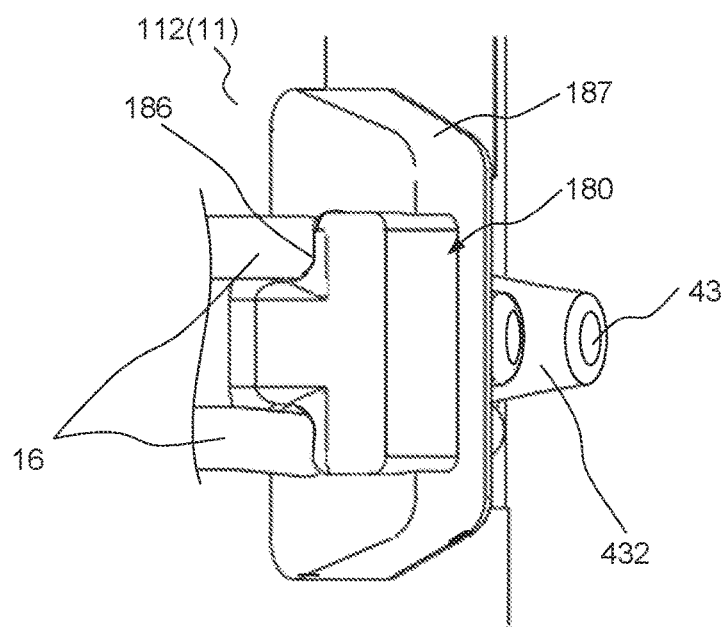
FIG. 15 is a diagram provided for describing a variation of the wire holding part.

Although wire holding part 18 holds lead wire 16 such that lead wire 16 does not move by welding or at least lead wire 16 is restricted from radially moving, the present invention is not limited thereto and wire holding part 18 may be configured to hold lead wire 16 by using adhesive 187 as illustrated in FIG. 15.

FIG. 15 is a diagram provided for describing a variation of the wire holding part, and indicates wire holding part 180 that is provided in the outer surface of peripheral wall part 112 of case main body 11 in place of wire holding part 18. Wire holding part 180 has a T shape projected from the outer peripheral surface of peripheral wall part 112 of case main body 11, and includes hooking part 186 which has a recessed shape and opens laterally between hooking part 186 and the outer peripheral surface. Hooking part 186 passes each of two lead wires 16 through the recessed shape and hooks each of two lead wires 16.

Wire holding part 180 inserts lead wire 16 into hooking part 186 and causes lead wire 16 to be hooked. At this time, lead wire 16 extends up to terminal tying part 43 in a state in which an intermediate part of lead wire 16 is hooked by hooking part 186, and the leading end part of lead wire 16 is connected to terminal tying part 43. Terminal tying part 43, wire holding part 180, and lead wire 16 are fixed by adhesive 187 in a state in which wire holding part 180 and lead wire 16 are in contact with terminal tying part 43.

<Operation of Vibration Actuator 1>

Figure 16:
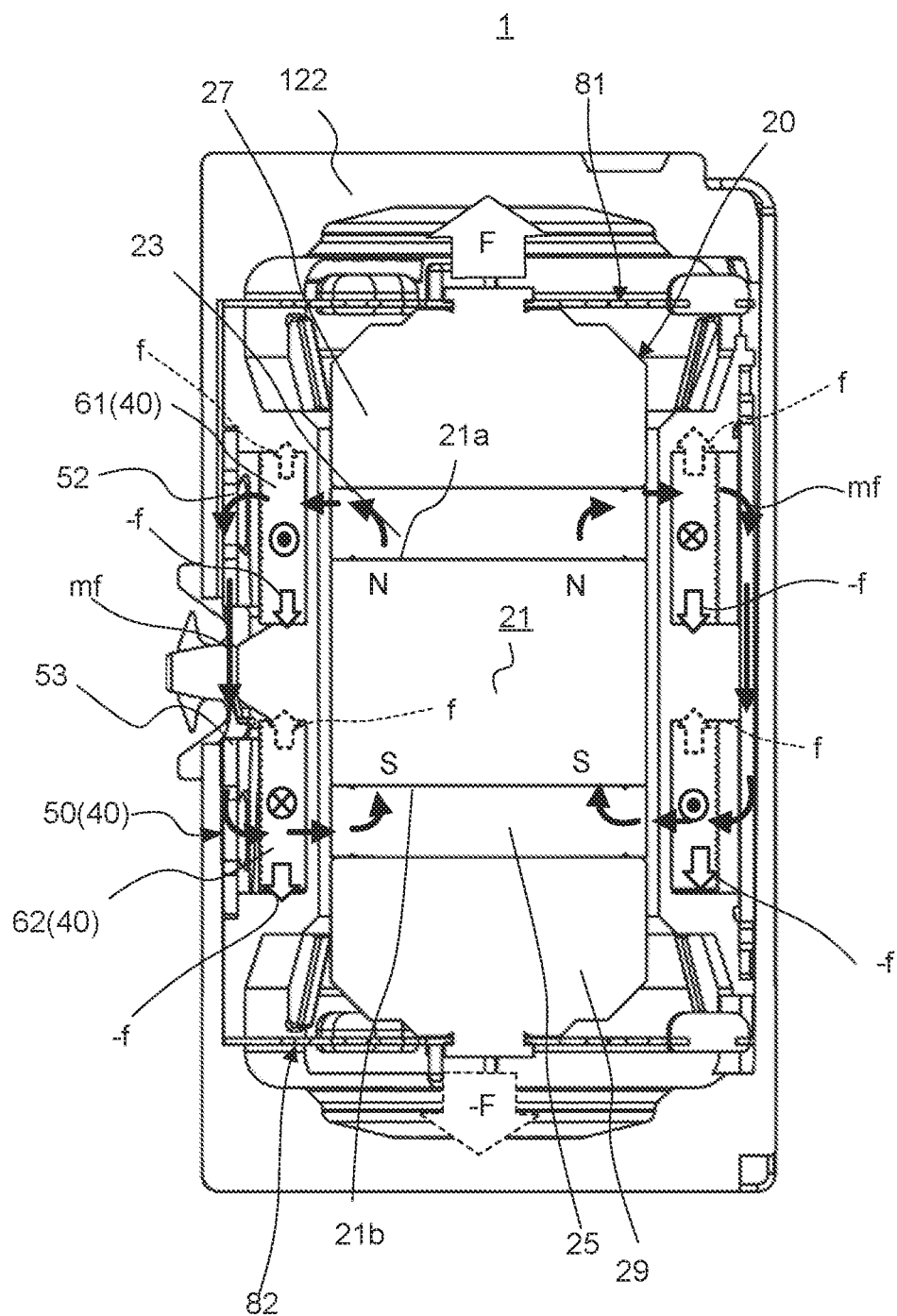
FIG. 16 schematically illustrates a configuration of a magnetic circuit of the vibration actuator.
Figure 17A:
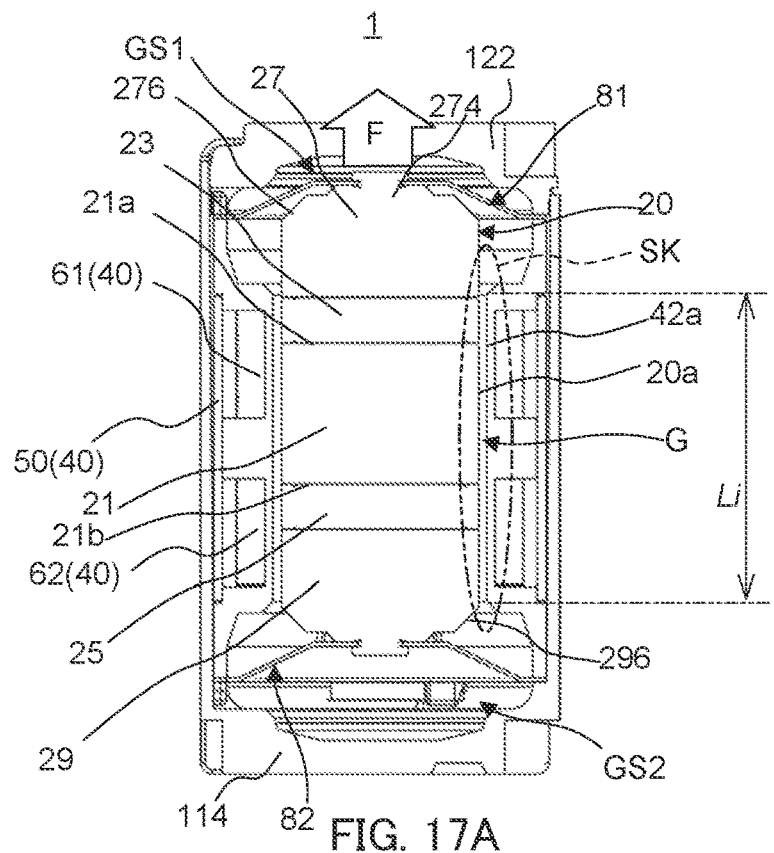
FIGS. 17A and 17B are diagrams provided for describing an operation of a main body of the vibration actuator.
Figure 17B:
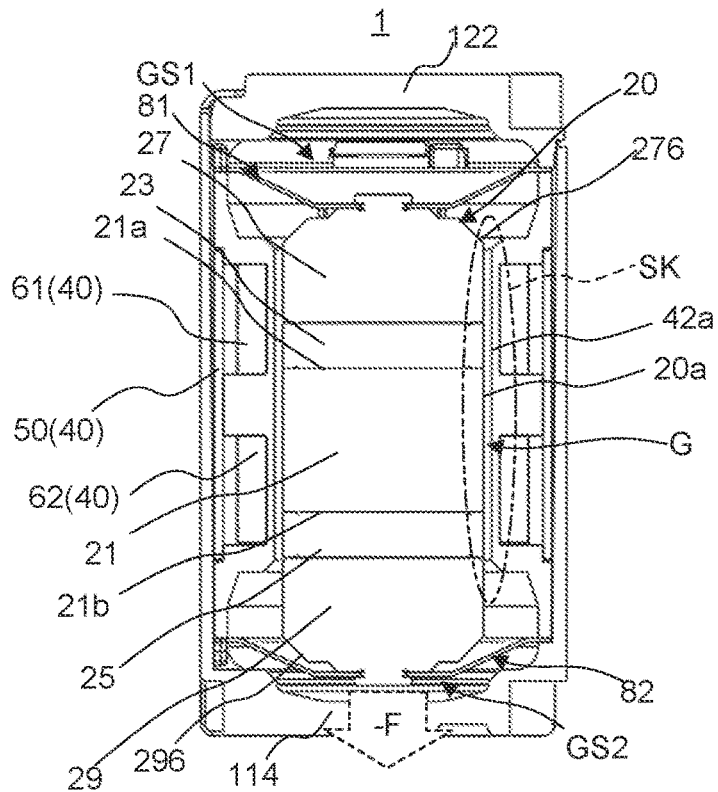

An operation of vibration actuator 1 due to a configuration of the magnetic circuit will be described with reference to FIGS. 16 to 17B. FIG. 16 schematically illustrates a configuration of a magnetic circuit of the vibration actuator. FIGS. 17A and 17B are diagrams provided for describing an operation of a main body of the vibration actuator. FIG. 17A illustrates a vibration state when the movable body is at the maximum amplitude position on a side of the top surface of the movable body. FIG. 17B is a diagram provided for describing an operation of the main body of the vibration actuator and illustrates a vibration state when the movable body is at the maximum amplitude position on a side of the bottom surface of the movable body.

An operation of vibration actuator 1 will be described with an example in which magnet 21 is magnetized such that a side of front surface 21a as one side (in the present embodiment, the upper side) of the magnetization direction is the N pole, and a side of rear surface 21b as the other side (in the present embodiment, the lower side) of the magnetization direction is the S pole.

In vibration actuator 1, movable body 20 is considered to correspond to a mass part in a vibration model of a spring-mass system. Accordingly, in a case where the resonance is sharp (includes a steep peak), the steep peak is suppressed by attenuating the vibration. By attenuating the vibration, the resonance is no longer steep, and the maximum amplitude position (maximum amplitude value) and the maximum movement amount of movable body 20 during the resonance do not vary, and thus, a vibration with a suitable and stable maximum movement amount is outputted.

In vibration actuator 1, the pair of coils 61 and 62 is disposed such that the coil axis is orthogonal to the magnetic flux from first yoke 23 and second yoke 25 that hold magnet 21 therebetween in the vibration direction.

Specifically, at the time of non-vibration in the case of no energization, magnetic flux flow mf is formed which is emitted from a side of front surface 21a of magnet 21, is radiated from first yoke 23 to a side of coil 61, passes through outer yoke 50, passes through second yoke 25 via coil 62, and enters magnet 21 from a side of rear surface 21b.

Accordingly, when energization is performed as illustrated in FIG. 16, a Lorentz force in −f direction is generated on the pair of coils 61 and 62 by interaction between the magnetic field of magnet 21 and an electric current flowing through the coil (the pair of coils 61 and 62) in accordance with Fleming's left hand rule.

The Lorentz force in −f direction is a direction orthogonal to the direction of the magnetic field and the direction of the electric current flowing through the coil (the pair of coils 61 and 62). Since the coil (the pair of coils 61 and 62) is fixed to fixing body 40 (coil holding part 42), a force opposite to the Lorentz force in −f direction is generated on movable body 20 including magnet 21 as thrust in F direction in accordance with the law of action-reaction. Thus, movable body 20 including magnet 21 moves in F direction, that is, to a side of lid part 12 (top surface part 122 of lid part 12) (see FIG. 17A).

Further, when the energization direction of the pair of coils 61 and 62 is switched to the opposite direction and the pair of coils 61 and 62 is energized, a Lorentz force in f direction as the opposite direction is generated (see FIG. 16). Due to the generation of the Lorentz force in f direction, a force opposite to the Lorentz force in f direction is generated on movable body 20 as thrust (thrust in −F direction) and movable body 20 moves in −F direction, that is, to a side of bottom part 114 of case main body 11 in accordance with the law of action-reaction (see FIG. 17B).

In vibration actuator 1, at the time of non-vibration in the case of non-energization, a magnetic attraction force acts between magnet 21 and outer yoke 50, and functions as a magnetic spring. With the magnetic attraction force generated between magnet 21 and outer yoke 50 and the restoration force of elastic support parts 81 and 82 to return to the original shape, movable body 20 returns to the original position.

Vibration actuator 1 is driven by an AC wave inputted from the power supply part (for example, driving control part 203 illustrated in FIGS. 19 and 20) to the pair of coils 61 and 62. That is, the energization direction of the pair of coils 61 and 62 is periodically switched, and the thrust in F direction on the side of top surface part 122 of lid part 12 and the thrust in −F direction on the side of bottom part 114 alternately act on movable body 20 as illustrated in FIG. 16. Accordingly, movable body 20 vibrates in the vibration direction.

As indicated by SK portion in FIGS. 17A and 17B, both the edge parts, which are at a distance from each other in the vibration direction, of inner peripheral surface 42a (the portion whose cross section is flat) of coil holding part 42, do not face chamfered parts 276 and 296 outward in the radial direction even in a case where movable body 20 is located at the maximum amplitude positions on the both sides in the vibration direction. Chamfered parts 276 and 296 are located outside inner peripheral surface 42a, and inner peripheral surface 42a faces outer peripheral surface 20a, which is flat, of movable body 20.

Movement of movable body 20 causes an air flow in the direction opposite to the movement direction of movable body 20 in gap G and generates a pipe resistance to the air.

Thus, it is possible to attenuate the vibration of movable body 20 and suitably generate the vibration of movable body 20 by generating a pressure loss to the air in gap G and increasing air attenuation within case 10.

Thus, it is possible to suitably attenuate the vibration of movable body 20 without providing case 10 with a ventilation hole and further without increasing the weight of movable body 20.

Thus, in vibration actuator 1, movement of movable body 20 makes it possible to attenuate the vibration of movable body 20 and to generate a suitable vibration by a pressure loss generated by air flowing through gap G.

Figure 18:
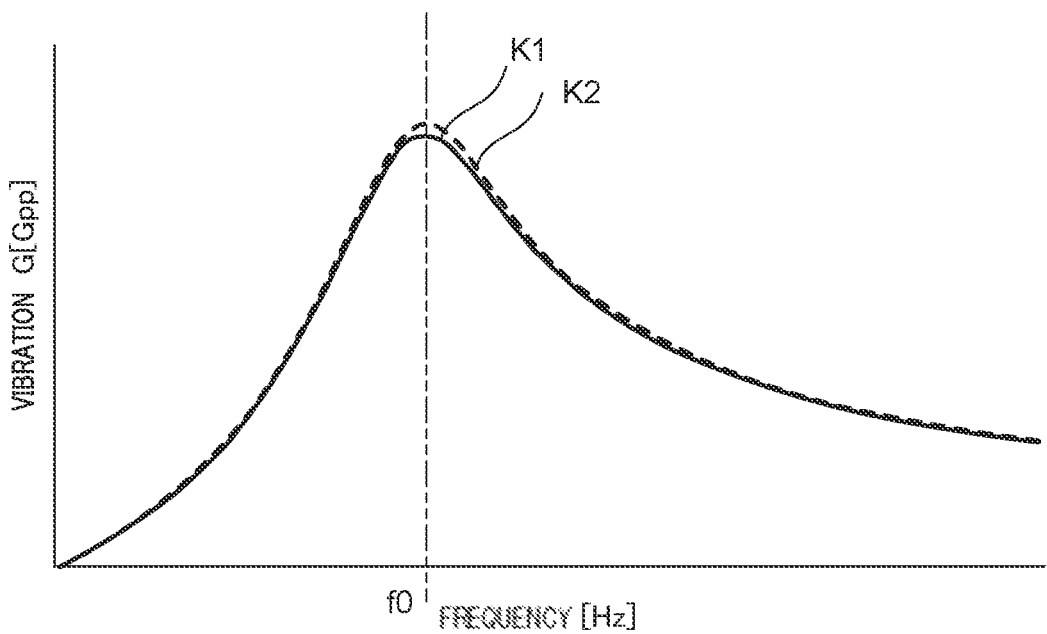
FIG. 18 is a diagram provided for describing a difference in resonance frequency between the presence and absence of air attenuation in the vibration actuator.

FIG. 18 is a diagram provided for describing air attenuation in vibration actuator 1 of the present embodiment.

FIG. 18 illustrates a resonance frequency of movable body 20, and compares resonance frequency f0 in vibration actuator 1 that performs air attenuation with resonance frequency f0 in, for example, an actuator that does not perform air attenuation by being provided with a ventilation hole, or the like. Given the comparison, vibration actuator 1 that has performed air attenuation makes it possible to suppress only G value (K1) of the peak of resonance frequency f0. Thus, vibration actuator 1 can increase G values in their entirety other than that of resonance frequency f0 by applying a voltage with an equal frequency peak, and can generate a suitable vibration in a wider frequency band.

As described above, vibration actuator 1 is configured to cause a flow of a fluid in a direction opposite to a direction of movement of movable body 20 in gap G and to generate a pipe resistance to the fluid. A vibration can be broadened by giving air attenuation to the vibration by a pipe resistance to air. Vibration actuator 1 is capable of generating, while size reduction is being achieved, a suitable vibration output in a wide frequency band in accordance with an environment for use or the like.

Note that, outer peripheral surface 20a of movable body 20 has a length protruding from the inner peripheral surface of tubular main body part (main body part) 422 of coil holding part 42 on both sides of outer peripheral surface 20a in the axial direction over the entire movable field of movable body 20. Thus, it is possible to maintain generation of a pipe resistance serving as an air attenuation effect in the entire movable field.

Each of outer peripheral surface 20a of movable body 20 and inner peripheral surface 42a of tubular main body part 422 is flat in the axial direction such that gap G has a constant width in the axial direction when movable body 20 does not move and is maintained constant in the axial direction when movable body 20 moves, and each of outer peripheral surface 20a of movable body 20 and inner peripheral surface 42a of tubular main body part 422 maintains generation of a straight pipe loss to the air over the entire movable field. Thus, it is possible to stabilize air attenuation.

Fixing body 40 includes a pair of movable spaces (fluid housing chamber chambers) GS1 and GS2 communicating with gap G at both the end parts of fixing body 40 in the axial direction. The pair of movable spaces GS1 and GS2 steeply expands in diameter with respect to inner peripheral surface 42a such that a loss due to a change in a shape of a flow path at an entrance of gap G and at an exit of gap G is generated over the entire movable field of movable body 20, and thus, it is possible to ensure the air attenuation effect in the entire movable field. Further, since movable spaces GS1 and GS2 have a plane-symmetrical shape with respect to a normal section through the center position of movable spaces GS1 and GS2 in the axial direction, it is possible to cause the reciprocating movement of air to be symmetric and to stabilize the air attenuation effect.

Hereinafter, the driving principle of vibration actuator 1 is briefly described. In the vibration actuator 1 of the present embodiment, movable body 20 vibrates with respect to fixing body 40 at resonance frequency $F_r$ [Hz] calculated by following equation 1, in a case where m [kg] is the mass of movable body 20, and $K_{sp}$ is the spring constant of the spring (elastic support parts 81 and 82 as springs).

[1]

$$F_r = \frac{1}{2\pi}\sqrt{\frac{K_{sp}}{m}} \qquad \text{(Equation 1)}$$

Since movable body 20 is considered to configure a mass part in a vibration model of a spring-mass system, movable body 20 reaches the resonance state when an AC wave of a frequency equal to resonance frequency $F_r$ of movable body 20 is inputted to the coil (the pair of coils 61 and 62). That is, movable body 20 can be efficiently vibrated by inputting an AC wave of a frequency substantially equal to resonance frequency $F_r$ of movable body 20 from the power supply part to the coil (the pair of coils 61 and 62).

An equation of motion and a circuit equation representing the driving principle of vibration actuator 1 will be described below. Vibration actuator 1 is driven based on the equation of motion represented by following equation 2 and the circuit equation represented by following equation 3.

[2]

$$m\frac{d^2x(t)}{dt^2} = K_r i(t) - K_{sp}x(t) - D\frac{dx(t)}{dt} \qquad \text{(Equation 2)}$$

m: mass [kg]
x(t): displacement [m]
$K_f$: thrust constant [N/A]
i(t): electric current [A]
$K_{sp}$: spring constant [N/m]
D: attenuation coefficient [N/(m/s)]

[3]

$$e(t) = Ri(t) + L\frac{di(t)}{dt} + K_e\frac{dx(t)}{dt} \qquad \text{(Equation 3)}$$

e(t): voltage [V]
R: resistance [SZ]
L: inductance [H]
$K_e$: counterelectromotive force constant [V/(rad/s)]

That is, mass m [kg], displacement x(t) [m], thrust constant Kf [N/A], electric current i(t) [A], spring constant $K_{sp}$ [N/m], attenuation coefficient D [N/(m/s)] and the like 10 in vibration actuator 1 can be appropriately changed as long as equation 2 is satisfied. In addition, voltage e(t) [V], resistance R [Ω], inductance L [H], and counterelectromotive force constant $K_e$ [V/(rad/s)] can be appropriately changed as long as equation 3 is satisfied.

As described above, in vibration actuator 1, a large vibration output can be efficiently obtained in a case where coils 61 and 62 are energized with an AC wave corresponding to resonance frequency $F_r$ determined by mass m of movable body 20 and spring constant $K_{sp}$ of elastic support parts 81 and 82 as leaf springs.

Further, vibration actuator 1 is driven by the resonance phenomenon using the resonance frequency represented by equation 1 and satisfying equations 2 and 3. Thus, vibration actuator 1 can be driven with a low power consumption, that is, a linear reciprocation vibration of movable body 20 can be performed with a low power consumption. In addition, when attenuation coefficient D is increased, a vibration can be generated over a higher bandwidth.

According to the present embodiment, elastic support parts 81 and 82 having a plate shape are disposed on the upper and lower sides of movable body 20 (in the vibration direction). Thus, vibration actuator 1 can stably drive movable body 20 in the up-down direction and at the same time can efficiently distribute the magnetic flux of the pair of coils 61 and 62 from elastic support parts 81 and 82 on the upper and lower sides of magnet 21. Thus, a high output vibration can be realized as vibration actuator 1.

Further, vibration actuator 1 is configured to include gap G, and gap G (specifically, the width (length in the radial direction) of gap G) is set to satisfy following equation 4.

[4]
$$\Delta P = \lambda \frac{Li}{h} \frac{\rho}{4} u^2 \qquad \text{(Equation 4)}$$

ΔP: pressure loss (air attenuation) [Pa]
λ: pipe friction coefficient
Li: pipe length [m]
h: air gap [m]
ρ: fluid density [kg/m³]
u: flow rate [m/s]

Note that, inner peripheral surface 42a and outer peripheral surface 20a that define gap G correspond to the pipe in the equation described above. Pressure loss ΔP [Pa] is a phenomenon in which a flow receives resistance due to a friction with a wall surface or the shape of a wall surface and the pressure drops when a fluid flows between inner peripheral surface 42a of coil holding part 42 and outer peripheral surface of movable body 20. Pipe friction coefficient (friction coefficient of the members (inner peripheral surface 42a and outer peripheral surface 20a) surrounding gap G) k, pipe length (the length of the members (inner peripheral surface 42a and outer peripheral surface 20a) surrounding gap G in the vibration direction) Li [m], air gap (the length of gap G in the radial direction) h [m], fluid (air) density ρ [kg/m³], flow rate u [m/s], and the like can be appropriately changed as long as equation 4 is satisfied. In particular, a pressure loss, that is, air attenuation can be increased by increasing length Li of gap G in the vibration direction and causing air gap h to be narrower, that is, shortening the length of gap G in the radial direction. For example, a predetermined threshold value may be set for Li/h and gap G may satisfy the resulting equation.

(Electronic Apparatus)

Figure 19:
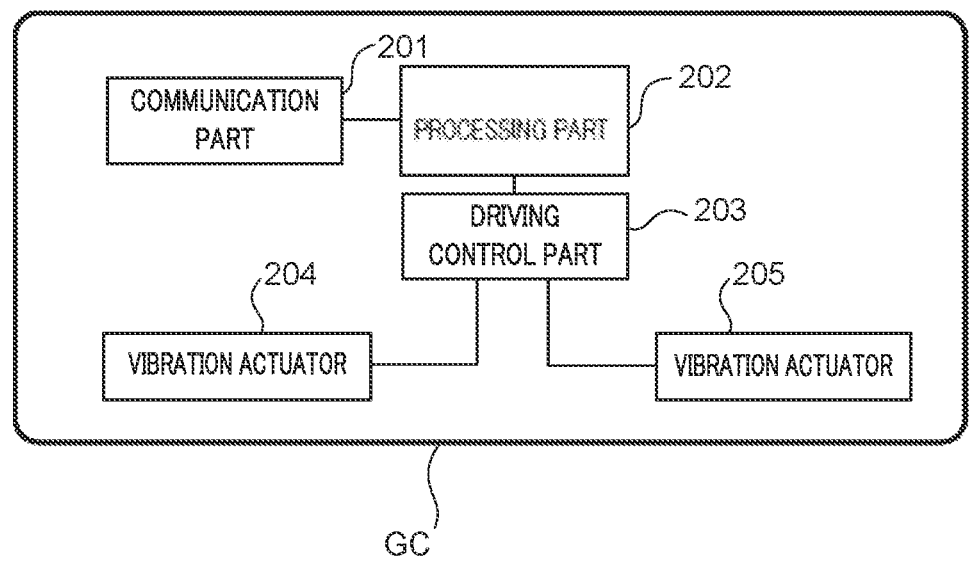
FIG. 19 illustrates an example in which the vibration actuator is implemented in a game controller.
Figure 20:
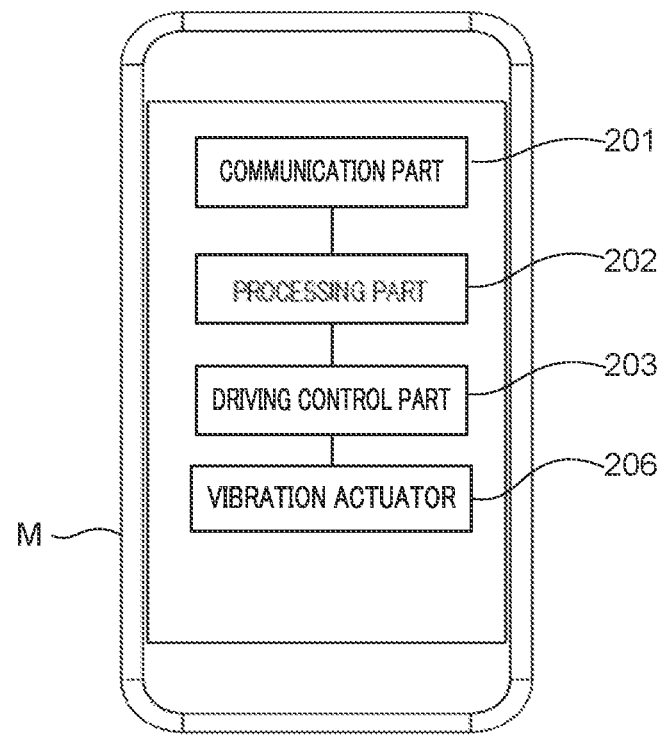
FIG. 20 illustrates an example in which the vibration actuator is implemented in a portable terminal.

FIGS. 19 and 20 illustrate exemplary implementation aspects of vibration actuator 1. FIG. 19 illustrates an example in which vibration actuator 1 is implemented in game controller GC and FIG. 19 illustrates an example in which vibration actuator 1 is implemented in portable terminal M.

Game controller GC is, for example, connected to a game machine main body by radio communication, and is used by being gripped or held by the user. In FIG. 19, game controller GC has a rectangular plate shape, and the user operates game controller GC while grasping right and left sides thereof with both hands.

Game controller GC notifies the user of a command from the game machine main body by vibration. Note that, game controller GC has, although not illustrated, functions other than the command notification, for example, an input operation part with respect to the game machine main body.

Portable terminal M is, for example, a portable communication terminal such as a mobile phone or a smartphone. Portable terminal M notifies the user of an incoming call from an external communication apparatus and realizes each function (for example, function of giving an operational feeling and/or a sense of realism) of portable terminal M by vibration.

As illustrated in FIGS. 19 and 20, each of game controller GC and portable terminal M includes communication part 201, processing part 202, driving control part 203, and vibration actuators 204, 205 and 206 that are vibration actuator 1 as a driving part. Note that, a plurality of vibration actuators 204 and 205 is implemented in game controller GC.

In game controller GC and portable terminal M, vibration actuators 204 to 206 are preferably implemented such that a main surface of a terminal and a surface orthogonal to the vibration direction of vibration actuators 204 to 206, here, the bottom surface of bottom part 114 are parallel to each other, for example.

The main surface of the terminal is a surface that comes into contact with the body surface of the user and in the present embodiment, the main surface of the terminal means a vibration transmission surface that comes into contact with the body surface of the user and transmits a vibration thereto. Note that, the main surface of the terminal and the bottom surface of bottom part 114 of vibration actuators 204, 205 and 206 may be disposed so as to be orthogonal to each other.

Specifically, vibration actuators 204 and 205 are implemented in game controller GC such that a surface with which a fingertip, a ball of a finger, a palm of a hand or the like of the user operating game controller GC comes into contact, or a surface provided with an operation part is orthogonal to the vibration direction. Further, in the case of portable terminal M, vibration actuator 206 is implemented therein such that a display screen (touch screen surface) is orthogonal to the vibration direction. Thus, a vibration in a direction perpendicular to the main surface of game controller GC and portable terminal M is transmitted to the user.

Communication part 201 is connected to an external communication apparatus by radio communication, receives a signal from the communication apparatus, and outputs the signal to processing part 202. In the case of game controller GC, the external communication apparatus is a game machine main body as an information communication terminal, and communication is performed in accordance with the short range radio communication standards such as Bluetooth (registered trademark). In the case of portable terminal M, the external communication apparatus is, for example, a base station, and communication is performed in accordance with the mobile communication standards.

Processing part 202 converts an inputted signal into a driving signal for driving vibration actuators 204, 205 and 206 by a conversion circuit part (illustration is omitted), and outputs the driving signal to driving control part 203. Note that, in portable terminal M, processing part 202 generates a driving signal based on signals inputted from various function parts (illustration is omitted; for example, an operation part such as a touch screen) in addition to a signal inputted from communication part 201.

Driving control part 203 is connected to vibration actuators 204, 205 and 206, and a circuit for driving vibration actuators 204, 205 and 206 is implemented therein. Driving control part 203 provides vibration actuators 204, 205 and 206 with a driving signal.

Vibration actuators 204, 205 and 206 are driven in accordance with a driving signal from driving control part 203. Specifically, in vibration actuators 204, 205 and 206, movable body 20 vibrates in the direction orthogonal to the main surface of portable terminal M and game controller GC.

Note that, movable body 20 may come into contact with top surface part 122 of lid part 12 or bottom part 114 via a damper each time movable body 20 vibrates. In this case, an impact on top surface part 122 of lid part 12 or bottom part 114 accompanied by the vibration of movable body 20, that is, an impact on the housing is directly transmitted to the user as a vibration.

Since a vibration in the direction perpendicular to the user's body surface which comes into contact with game controller GC or portable terminal M is transmitted to the body surface of the user, a sufficient body-felt vibration can be given to the user. In game controller GC, a body-felt vibration to the user can be given by one or both of vibration actuators 204 and 205, and at least it is possible to give a vibration with a high expression capability, such as selectively giving a strong vibration or a weak vibration.

Hereinabove, the invention made by the present inventors has been specifically described based on the embodiment. However, the present invention is not limited to the above-described embodiment and modification can be made without departing from the gist thereof.

Further, the vibration actuator according to the present invention may be implemented in a contact part, which comes into contact with the user, of a portable apparatus other than game controller GC and portable terminal M (for example, a portable information terminal such as a tablet PC, and a portable game terminal) and the like.

That is, vibration actuator 1 may be implemented in a contact part, which comes into contact with the user, of a hand-carry electric apparatus such as a portable terminal and electric beauty equipment such as a facial massager. Vibration actuator 1 may be implemented in a contact part, which comes into contact with the user, of a wearable terminal that is worn and used by the user. For example, in the case of a hand-carry electric apparatus such as game controller GC, the contact part which comes into contact with the user is, for example, a handle part that is grasped by the user during use. For example, in the case of a wearable electric apparatus such as a facial massager, the contact part which comes into contact with the user is, for example, a pressurization part that applies pressure to the body surface of the user.

INDUSTRIAL APPLICABILITY

The vibration actuator according to the present invention is capable of generating, while size reduction is being achieved, a suitable vibration output in a wide frequency band in accordance with an environment for use or the like, and is useful for being mounted in an electronic apparatus such as a game machine terminal or a portable terminal or in an electric apparatus such as an electric beauty apparatus.

REFERENCE SIGNS LIST

1, 204, 205, 206 Vibration actuator
10 Case
11 Case main body
12 Lid part
15 Driving unit
16 Lead wire
18 Wire holding part
20 Movable body
20a Outer peripheral surface
21 Magnet
21a Front surface
21b Rear surface
23 First yoke
25 Second yoke
27, 29 Weight part
40 Fixing body
41 Routing part
42 Coil holding part (main body part)
42a Inner peripheral surface
42b, 42c Coil attachment part
43 Terminal tying part
44, 45 Engagement protrusion part
46 Terminal drawing part
47 Communication groove part
50 Outer yoke
51 Yoke main body
52 End part
53 Opening part
60, 61, 62 Coil
63, 64 Winding wire
81, 82 Elastic support part
88 Attenuation part
112 Peripheral wall part
113 Notch
114 Bottom part
118, 128 Step part
122 Top surface part
122b Recess
124 Downwardly extending part
127 Engagement recess
180 Wire holding part
182 Wire insertion part
184 Wire fixing part
186 Hooking part
187 Adhesive
201 Communication part
202 Processing part
203 Driving control part
232, 252 Groove part (gathering part)
272, 292 Weight main body
274, 294 Spring fixing part
276, 296 Chamfered part
420 Recessed part
422 Tubular main body part
426 Center flange part
426a Outer periphery part
427, 428 End flange part
427a, 428a Opening end part
432 Fillet
802 Inner periphery part
802a Connection hole
804 Deformation arm
806 Outer periphery part
808 Groove part

The invention claimed is:

1. A vibration actuator, comprising:
a movable body including a magnet having a pillar shape; and a fixing body including a coil and a main body part, the main body part including an inner peripheral surface and supporting the movable body via an elastic support part such that the movable body is vibratable in an axial direction of the movable body, the inner peripheral surface surrounding the movable body with a gap between the inner peripheral surface and an outer peripheral surface of the movable body inside the coil, wherein the vibration actuator is configured to cause a flow of a fluid in a direction opposite to a direction of movement of the movable body in the gap and to generate a pipe resistance to the fluid, the outer peripheral surface of the movable body has a length protruding from the inner peripheral surface of the main body part on both sides of the outer peripheral surface in the axial direction over an entire movable field of the movable body, the movable body includes the magnet in a center part of the movable body in the axial direction, includes a pair of weight parts in both end parts of the movable body in the axial direction, and includes a pair of yokes between the magnet and the pair of weight parts, the magnet, the pair of yokes, and the pair of weight parts are each formed in a cylindrical shape with an identical diameter and are joined to each other such that outer peripheral surfaces of the magnet, the pair of yokes, and the pair of weight parts are flush with each other, and a joined part between the magnet and each of the pair of yokes or a joined part between each of the pair of yokes and a corresponding one of the pair of weight parts is provided with a gathering part that gathers an adhesive or a welding material.

2. The vibration actuator according to claim 1, wherein each of the outer peripheral surface of the movable body and the inner peripheral surface of the main body part is flat in the axial direction such that the gap has a constant width in the axial direction when the movable body does not move and is maintained constant in the axial direction when the movable body moves, and each of the outer peripheral surface of the movable body and the inner peripheral surface of the main body part maintains generation of a straight pipe loss to the fluid over the entire movable field.

3. An electric apparatus that is a hand-carry electric apparatus or a wearable electric apparatus, the electric apparatus comprising a configuration in which the vibration actuator according to claim 1 is implemented in a contact part which comes into contact with a user.

4. A vibration actuator, comprising:

a movable body including a magnet having a pillar shape; and a fixing body including a coil and a main body part, the main body part including an inner peripheral surface and supporting the movable body via an elastic support part such that the movable body is vibratable in an axial direction of the movable body, the inner peripheral surface surrounding the movable body with a gap between the inner peripheral surface and an outer peripheral surface of the movable body inside the coil, wherein the vibration actuator is configured to cause a flow of a fluid in a direction opposite to a direction of movement of the movable body in the gap and to generate a pipe resistance to the fluid, the outer peripheral surface of the movable body has a length protruding from the inner peripheral surface of the main body part on both sides of the outer peripheral surface in the axial direction over an entire movable field of the movable body, the fixing body includes a pair of fluid housing chambers communicating with the gap at both end parts of the fixing body in the axial direction, and the pair of fluid housing chambers steeply expands in diameter with respect to the inner peripheral surface such that a loss due to a change in a shape of a flow path at an entrance of the gap and at an exit of the gap is generated over the entire movable field of the movable body.

5. The vibration actuator according to claim 4, wherein the pair of fluid housing chambers is a pair of hermetically sealed spaces having a plane-symmetrical shape with respect to a normal section through a center position of the pair of hermetically sealed spaces in the axial direction.

6. The vibration actuator according to claim 4, wherein:

the movable body includes the magnet in a center part of the movable body in the axial direction, includes a pair of weight parts in both end parts of the movable body in the axial direction, and includes a pair of yokes between the magnet and the pair of weight parts, and the magnet, the pair of yokes, and the pair of weight parts are each formed in a cylindrical shape with an identical diameter and are joined to each other such that outer peripheral surfaces of the magnet, the pair of yokes, and the pair of weight parts are flush with each other.

7. The vibration actuator according to claim 4, wherein a joined part between the magnet and each of the pair of yokes or a joined part between each of the pair of yokes and a corresponding one of the pair of weight parts is provided with a gathering part that gathers an adhesive or a welding material.

8. The vibration actuator according to claim 4, wherein each of the outer peripheral surface of the movable body and the inner peripheral surface of the main body part is flat in the axial direction such that the gap has a constant width in the axial direction when the movable body does not move and is maintained constant in the axial direction when the movable body moves, and each of the outer peripheral surface of the movable body and the inner peripheral surface of the main body part maintains generation of a straight pipe loss to the fluid over the entire movable field.

9. An electric apparatus that is a hand-carry electric apparatus or a wearable electric apparatus, the electric apparatus comprising a configuration in which the vibration actuator according to claim 4 is implemented in a contact part which comes into contact with a user.

* * * * *